(12) United States Patent
Saunders

(10) Patent No.: US 10,878,706 B2
(45) Date of Patent: Dec. 29, 2020

(54) TRAJECTORY PLANNER FOR A VEHICLE

(71) Applicant: Aurora Flight Sciences Corporation, Manassas, VA (US)

(72) Inventor: Jeffery Saunders, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 119 days.

(21) Appl. No.: 16/158,987

(22) Filed: Oct. 12, 2018

(65) Prior Publication Data

US 2020/0118446 A1   Apr. 16, 2020

(51) Int. Cl.
| G08G 5/00 | (2006.01) |
| G05D 1/00 | (2006.01) |
| G05D 1/02 | (2020.01) |
| G08G 5/04 | (2006.01) |

(52) U.S. Cl.
CPC ......... G08G 5/0034 (2013.01); G05D 1/0088 (2013.01); G05D 1/0202 (2013.01); G08G 5/0069 (2013.01); G08G 5/045 (2013.01)

(58) Field of Classification Search
CPC .... G08G 5/0034; G08G 5/045; G08G 5/0069; G05D 1/0202; G05D 1/0088; G05D 1/101; G01C 21/20; B64C 2201/141
See application file for complete search history.

(56) References Cited

U.S. PATENT DOCUMENTS

| 8,038,062 B2 | 10/2011 | Kenefic |
| 8,437,890 B2 | 5/2013 | Anderson et al. |
| 9,262,929 B1 | 2/2016 | Roy et al. |
| 9,411,335 B2 * | 8/2016 | Kim ........................ B25J 9/1666 |
| 9,557,742 B2 | 1/2017 | Paduano et al. |
| 2015/0100194 A1 | 4/2015 | Terada |
| 2015/0226575 A1 * | 8/2015 | Rambo ................. G05D 1/101 701/523 |
| 2015/0276411 A1 * | 10/2015 | Savarit .................. G01C 21/00 701/467 |

(Continued)

FOREIGN PATENT DOCUMENTS

CN           108458717 A      8/2018

OTHER PUBLICATIONS

Dubins, L.E. (Jul. 1957). "On Curves of Minimal Length with a Constraint on Average Curvature, and with Prescribed Initial and Terminal Positions and Tangents," American Journal of Mathematics. 79 (3): 497-516.

Satyanarayana G. Manyam, Sivakumar Rathinam, David Casbeer, Eloy Garcia, "Shortest Paths of Bounded Curvature for the Dubins Interval Problem," https://www.researchgate.net/publication/280497994, Jul. 2015.

(Continued)

*Primary Examiner* — Michael J Zanelli
(74) *Attorney, Agent, or Firm* — Michael Stanley Tomsa; McAndrews, Held & Malloy, Ltd.; Eugene H. Nahm

(57) ABSTRACT

The present disclosure is directed to systems and methods for trajectory and route planning including obstacle detection and avoidance for an aerial vehicle. For example, an aerial vehicle's flight control system may include a trajectory planner that may use short segments calculated using an iterative Dubins path to find a first path between a start point and an end point that does not avoid obstacles. Then the trajectory planner may use a rapidly exploring random tree algorithm that uses points along the first path as seed points to find a trajectory or route between the start point and end point that avoids known or detected obstacles.

20 Claims, 12 Drawing Sheets

(56) References Cited

U.S. PATENT DOCUMENTS

| | | | |
|---|---|---|---|
| 2015/0356875 A1* | 12/2015 | Sane | G08G 5/0086 |
| | | | 701/408 |
| 2016/0048132 A1* | 2/2016 | Cherepinsky | G08G 5/0052 |
| | | | 701/4 |
| 2017/0168485 A1 | 6/2017 | Berntorp et al. | |
| 2017/0193830 A1 | 7/2017 | Fragoso et al. | |
| 2018/0196435 A1 | 7/2018 | Kunzi et al. | |

OTHER PUBLICATIONS

Sertac Karaman, Emilio Frazzoli, "Incremental Sampling-based Algorithms for Optimal Motion Planning", arXiv:1005.0416v1, May 3, 2010.

Brunner Michael et al: "Hierarchical Rough Terrain Motion Planning Using an Optimal Sampling-Based Method," 2013 IEEE International Conference on Robotics and Automation (ICRA); May 6-10, 2013; Karlsruhe, Germany, IEEE, US, May 6, 2013 (May 6, 2013), pp. 5539-5544, XP032505899, ISSN: 1050-4729, 001: 10.11 09/ICRA. 2013.6631372 ISBN: 978-1-4673-5641-1 [retrieved on Oct. 13, 2013].

Lugo-Cardenas Israel et al: "Dubins Path Generation for a Fixed Wing Uav", 2014 International Conference on Unmanned Aircraft Systems (ICUAS), IEEE, May 27, 2014 (May 27, 2014), pp. 339-346, XP03261 0453, 001: 10.11 09/ICUAS.2014.6842272 [retrieved on Jun. 23, 2014].

Extended European search report for EU application No. 19202806.6, dated Mar. 23, 2020.

\* cited by examiner

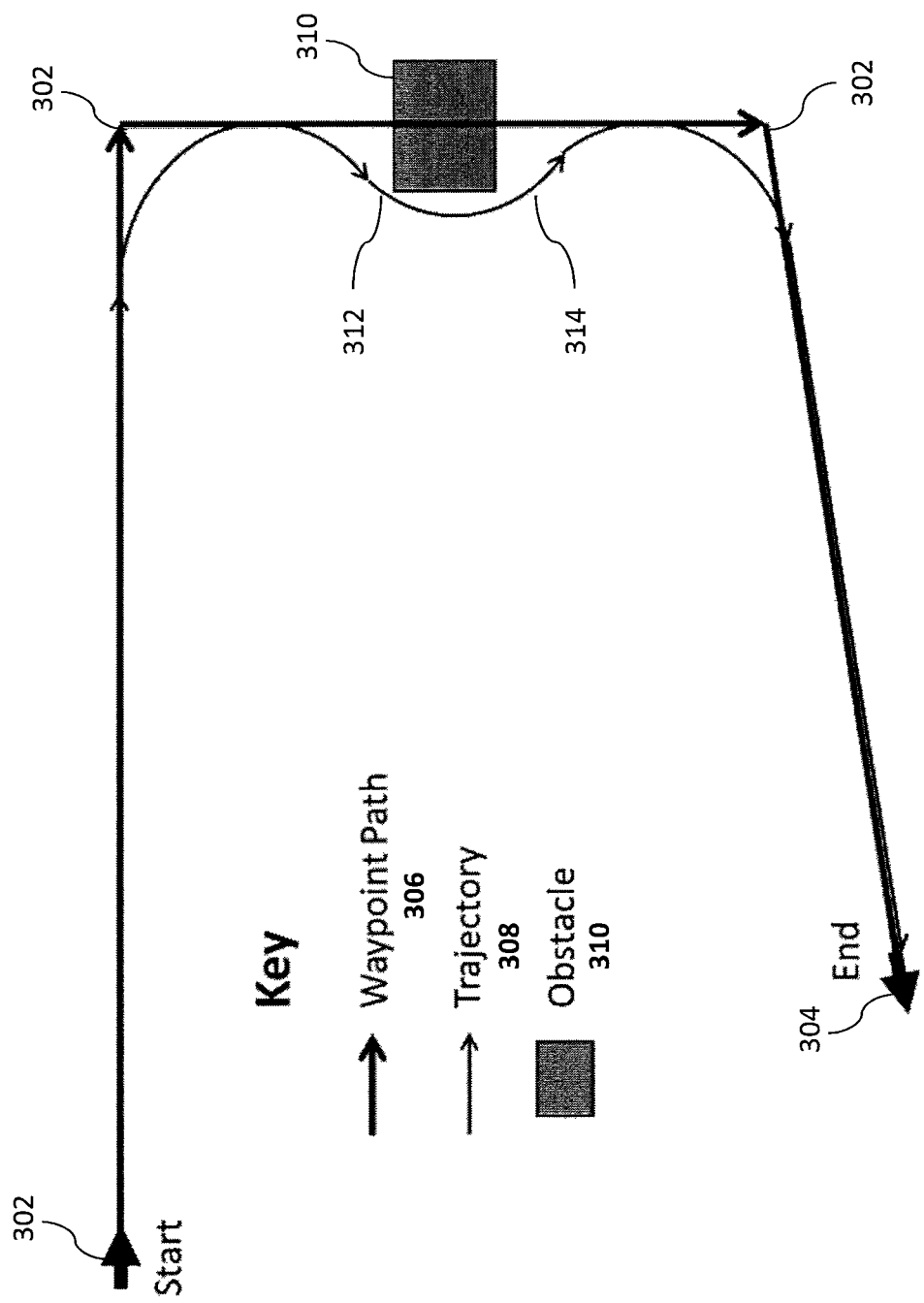

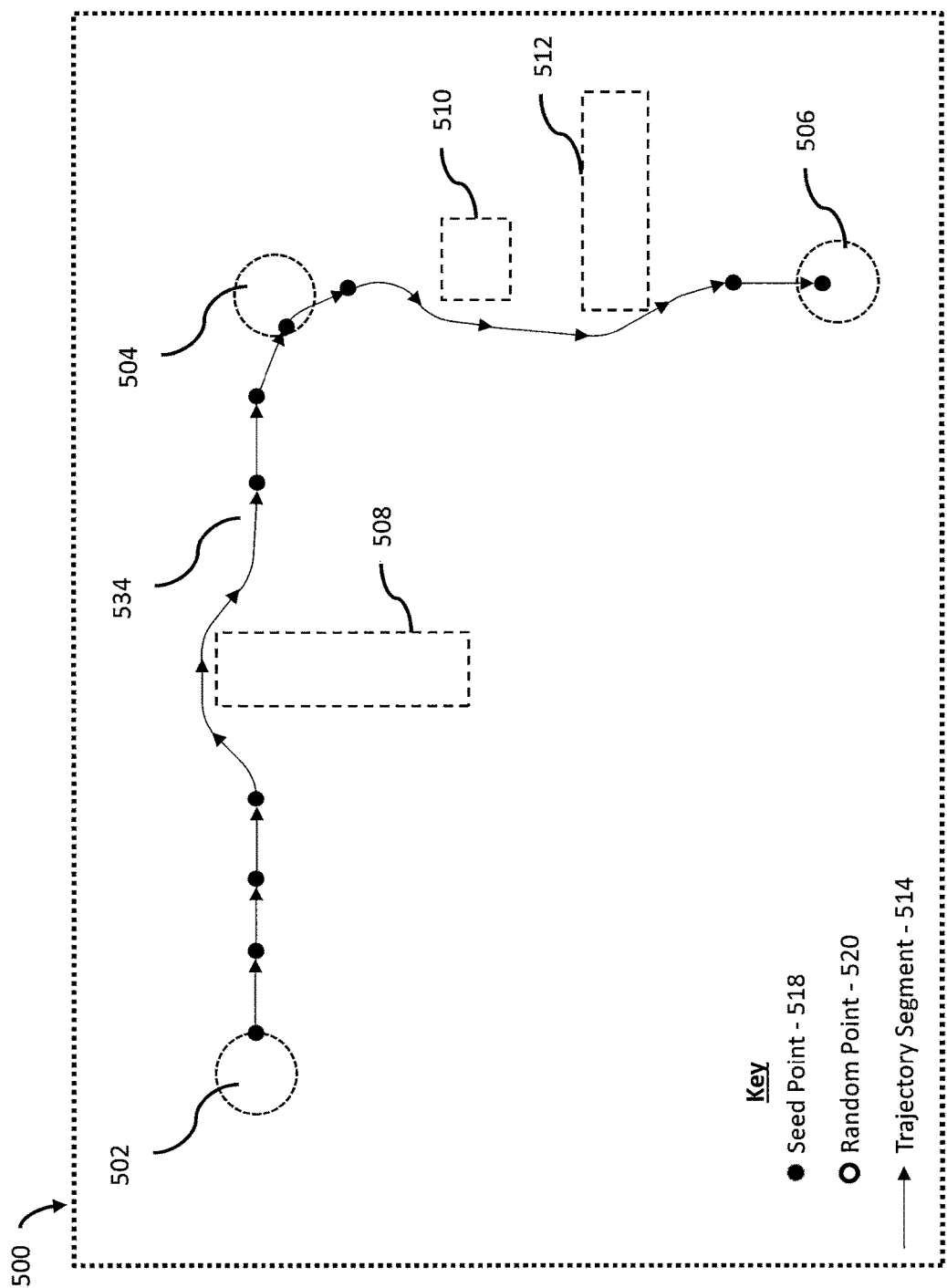

TRAJECTORY PLANNER FOR A VEHICLE

STATEMENT OF GOVERNMENT INTEREST

This invention was made with government support under Contract Number: N00014-12-C-0671 awarded by the United States Navy. The government has certain rights in the invention.

FIELD

This present disclosure generally relates to vehicle trajectory and route planning systems, methods, and apparatuses. More specifically, the present disclosure generally relates to vehicle trajectory and route planning systems, methods, and apparatuses for aerial vehicles.

BACKGROUND

Trajectory planning is generating a trajectory through space as a function of time that tracks a global waypoint path such that a vehicle can track the trajectory in time while satisfying the constraints of the aerial vehicle. Current trajectory planning methods and systems may link together approximations of short trajectories by geometric arcs and line segments. Current trajectory planning methods and systems suffer from the need to perform frequent updates, can take too much time to compute, and suffer from obstacle avoidance reliability issues.

SUMMARY

The present disclosure provides systems and methods for planning an obstacle avoiding trajectory of an aerial vehicle.

According to a first aspect, a system for navigating an aerial vehicle having a flight control system along a flight trajectory comprises: a sensor payload; and a processor operatively coupled with the sensor payload and in communication with the flight control system, wherein the processor is configured to: calculate a plurality of path trajectory segments based at least in part on sensor data from the sensor payload; calculate a first trajectory between a start point and an end point by linking the start and end points via a series of the path trajectory segments; identify a plurality of seed waypoints via the first trajectory; calculate a second trajectory between the start point and the end point that avoids at least one obstacle, detected by the sensor payload, by executing a random searching algorithm that uses the plurality of seed waypoints; generate navigational commands to instruct the aerial vehicle to navigate from the start point to the end point along the second trajectory; and communicate the navigational commands to the flight control system.

In certain aspects, the processor is configured to calculate the plurality of path trajectory segments iteratively.

In certain aspects, the processor is configured to calculate the plurality of path segments using a method comprising the steps of: (a) receiving as inputs a starting position, a starting velocity, an ending position, and an ending velocity of the aerial vehicle; (b) calculating a turning radius from the largest of the starting velocity and the ending velocity; (c) calculating a path trajectory segment based at least in part on the turning radius; (d) calculating an achievable velocity based at least in part on the first path and kinematic limits of the aerial vehicle; and (e) repeating steps b through d until the achievable velocity is substantially equal to the ending velocity, wherein in subsequent iterations the turning radius is calculated with the achievable velocity.

In certain aspects, executing the random searching algorithm includes executing a rapidly exploring random tree algorithm.

In certain aspects, the rapidly executing the exploring random tree algorithm comprises the steps of: (a) linking the start point and at least one of the seed waypoints while avoiding obstacles; (b) checking if the linked waypoints connect the start point to the end point; (c) linking the end point and at least one of the seed waypoints while avoiding obstacles; (d) adding a random waypoint; (e) linking at least one of the plurality of seed waypoints to random point while avoiding obstacles; (f) checking if the linked waypoints connect the start point to the end point; and (g) repeating steps (d) through (f) until the linked waypoints connect the start point to the end point.

In certain aspects, the processor is configured to smooth the second trajectory to shorten the length of the trajectory.

In certain aspects, the sensor payload is coupled to an obstacle detecting system, wherein the second trajectory is identified to avoid obstacles detected by the obstacle detection system.

In certain aspects, the sensor payload comprises at least one of: LIDAR, Radar, an echolocation system, or an optical sensor.

According to a second aspect, a method of navigating an aerial vehicle having a flight control system along a flight trajectory comprises: calculating, via a processor, a plurality of trajectory segment possibilities based at least in part on sensor data from a sensor payload coupled to the aerial vehicle that reflects at least a first velocity of the aerial vehicle, wherein the processor is operatively coupled with the sensor payload and in communication with the flight control system; calculating, via the processor, a first trajectory between a start point and an end point by linking the start and end points via a series of the trajectory segment possibilities; determining, via the processor, a plurality of seed waypoints via the first trajectory; calculating, via the processor, a second trajectory between the start point and the end point that avoids at least one obstacle by executing a random searching algorithm that uses the plurality of seed waypoints; generating, via the processor, navigational commands to instruct the aerial vehicle to navigate from the start point to the end point along the second trajectory; and communicating the navigational commands to the flight control system.

In certain aspects, the step of calculating a plurality of trajectory segment possibilities comprises: (a) receiving as inputs a starting position, a starting velocity, an ending position, and an ending velocity of the aerial vehicle; (b) calculating a turning radius from the largest of the starting velocity and the ending velocity; (c) calculating a path trajectory segment based at least in part on the turning radius; (d) calculating an achievable velocity based at least in part on the first path and kinematic limits of the aerial vehicle; and (e) repeating steps b through d until the achievable velocity is substantially equal to the ending velocity, wherein in subsequent iterations the turning radius is calculated with the achievable velocity.

In certain aspects, the executing the random searching algorithm comprises the steps of: (a) linking the start point and at least one of the seed waypoints while avoiding obstacles; (b) checking if the linked waypoints connect the start point to the end point; (c) linking the end point and at least one of the seed waypoints while avoiding obstacles; (d) adding a random waypoint; (e) linking at least one of the plurality of seed waypoints to random point while avoiding obstacles; (f) checking if the linked waypoints connect the start point to the end point; and (g) repeating steps d through f until the linked waypoints connect the start point to the end point.

In certain aspects, the step of calculating a plurality of trajectory segment possibilities comprises: (a) receiving as inputs a starting position, a starting velocity, an ending position, and an ending velocity of the aerial vehicle; (b) calculating a turning radius from the largest of the starting velocity and the ending velocity; (c) calculating a path trajectory segment based at least in part on the turning radius; (d) calculating an achievable velocity based at least in part on the first path and kinematic limits of the aerial vehicle; and (e) repeating steps b through d until one of: the achievable velocity is substantially equal to the ending velocity, or a predetermined maximum number of iterations is reached, wherein in subsequent iterations the turning radius is calculated with the achievable velocity.

In certain aspects, the executing the random searching algorithm comprises the steps of: (a) linking the start point and at least one of the seed waypoints while avoiding obstacles; (b) checking if the linked waypoints connect the start point to the end point; (c) linking the end point and at least one of the seed waypoints while avoiding obstacles; (d) adding a random waypoint; (e) linking at least one of the plurality of seed waypoints to random point while avoiding obstacles; (f) checking if the linked waypoints connect the start point to the end point; and (g) repeating steps d through f until one of: the linked waypoints connect the start point to the end point, or a predetermined maximum number of iterations is reached.

In certain aspects, the method further comprises executing a smoothing algorithm to shorten the obstacle avoiding trajectory.

In certain aspects, the plurality of trajectory segment possibilities accounts for possible acceleration and deceleration by the aerial vehicle within the obstacle avoiding trajectory.

In certain aspects, the method further comprises detecting at least one obstacle, wherein the second trajectory avoids the at least one detected obstacle.

According to a third aspect, a method of navigating an aerial vehicle having a flight control system along a flight trajectory comprises: calculating, via a processor that is in communication with the flight control system, a plurality of trajectory segment possibilities by executing the steps of: (a) receiving as inputs a starting position, a starting velocity, an ending position, and an ending velocity of the aerial vehicle; (b) calculating a turning radius from the largest of the starting velocity and the ending velocity; (c) calculating a path trajectory segment based at least in part on the turning radius; (d) calculating a velocity achievable based at least in part on the first path and kinematic limits of the aerial vehicle; and (e) repeating steps (b) through (d) until an achievable velocity is substantially equal to the ending velocity, wherein in subsequent iterations the turning radius is calculated with the achievable velocity; and calculating, via the processor, an obstacle avoiding trajectory between a starting position and an ending position by executing a random searching algorithm that uses the plurality of trajectory segments possibilities; generating, via the processor, navigational commands to instruct the aerial vehicle to navigate from the starting position to the ending position along the obstacle avoiding trajectory; and communicating the navigational commands to the flight control system.

In certain aspects, executing the random searching algorithm includes executing a rapidly exploring random tree algorithm.

In certain aspects, the rapidly executing the exploring random tree algorithm comprises the steps of: (a) linking the start point and at least one of the seed waypoints while avoiding obstacles; (b) checking if the linked waypoints connect the start point to the end point; (c) linking the end point and at least one of the seed waypoints while avoiding obstacles; (d) adding a random waypoint; (e) linking at least one of the plurality of seed waypoints to random point while avoiding obstacles; (f) checking if the linked waypoints connect the start point to the end point; and (g) repeating steps (d) through (f) until the linked waypoints connect the start point to the end point.

In certain aspects, the processor is configured to smooth the obstacle avoiding trajectory to shorten the length of the trajectory.

DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIG. 3 illustrates an example calculated optimal trajectory for an aerial vehicle along a waypoint path, the calculated trajectory avoiding an obstacle in the waypoint path.

FIG. 5d illustrates an example of a calculated trajectory after executing smoothing.

DESCRIPTION

Figure 1:
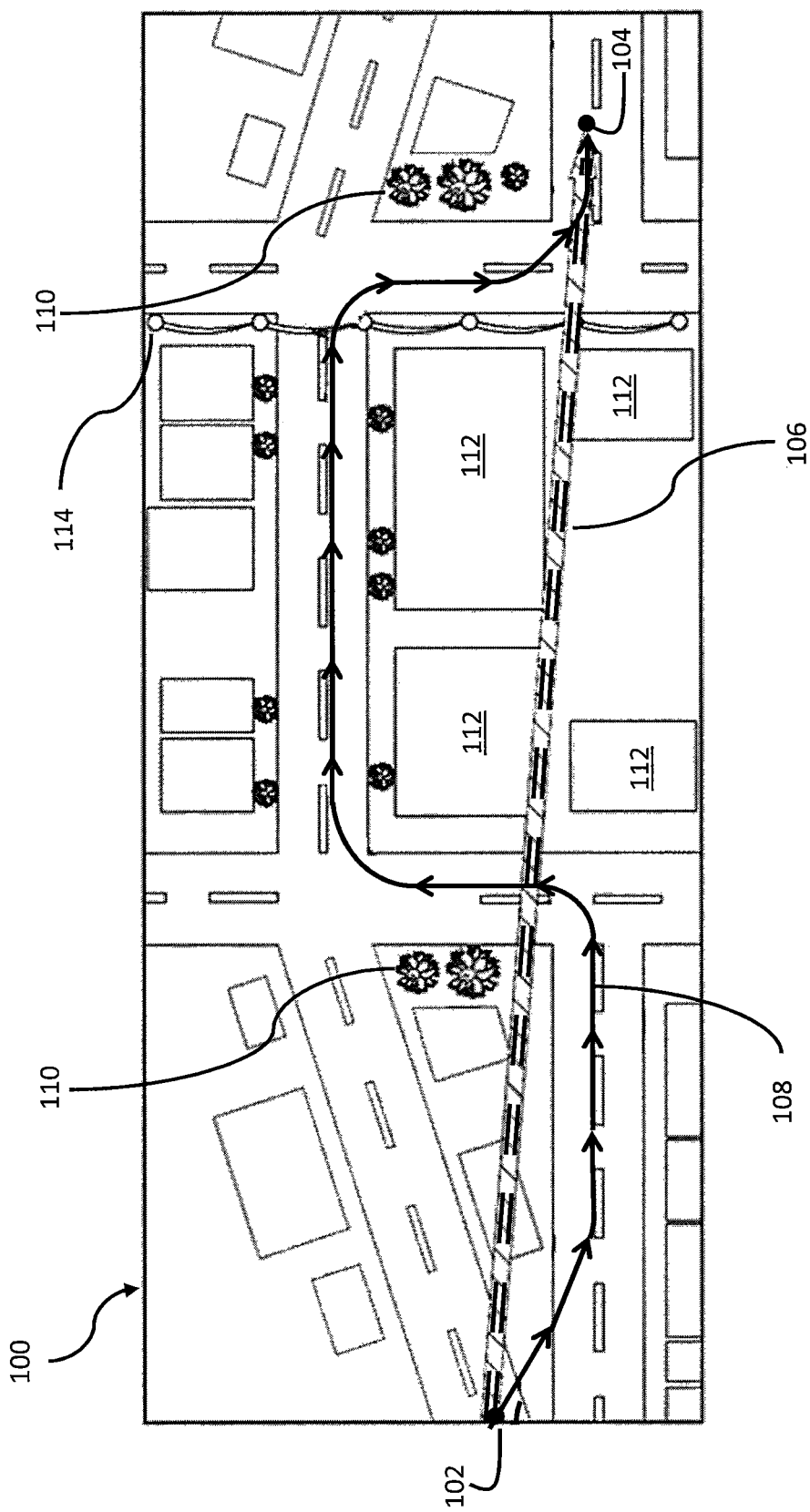
FIG. 1 illustrates an example environment for trajectory planning including obstacle avoidance.

Preferred embodiments of the present disclosure may be described hereinbelow with reference to the accompanying drawings. In the following description, well-known functions or constructions are not described in detail because they may obscure the disclosure in unnecessary detail. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. In the following description, it is understood that terms such as "first," "second," "top," "bottom," "side," "front," "back," and the like are words of convenience and are not to be construed as limiting terms. Further, the use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. For this disclosure, the following terms and definitions shall apply.

The terms "aerial vehicle" and "aircraft" refer to a machine capable of flight, including, but not limited to, traditional aircraft and VTOL aircraft, whether fixed wing, rotary wing, multirotor VTOL aircraft, etc.

The terms "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. Recitation of ranges of values herein are not intended to be limiting, referring instead individually to any and all values falling within the range, unless otherwise indicated herein, and each separate value within such a range is incorporated into the specification as if it were individually recited herein.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating," as used herein, refer to both transmitting, or otherwise conveying, data or information from a source to a destination and/or delivering data or information to a communications medium, system, channel, network, device, wire, cable, fiber, circuit, and/or link to be conveyed to a destination.

The term "computer," as used herein, refers to a programmable device designed to sequentially and automatically carry out a sequence of arithmetic or logical operations, including without limitation, personal computers (e.g., laptop and desktop computers), handheld, processor-based devices (e.g., smart phones, tablet computers, personal digital assistants (PDAs), etc.), and any other electronic device equipped with a processor (or microprocessor).

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The terms "exemplary" and "example" mean "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor," as used herein, refers to processing devices, apparatus, programs, circuits, components, systems, and subsystems, whether implemented in hardware, tangibly embodied software or both, and whether or not programmable. The term "processor," as used herein includes, but is not limited to, one or more computers, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, and data processors.

The present disclosure relates to systems and methods for providing trajectory and route planning in a vehicle (e.g., an aerial vehicle). Trajectory planning generally refers to the process of identifying/generating a trajectory through a given space (e.g., air space). The trajectory may be determined as a function of time that tracks a global waypoint path between two points (e.g., a starting point and an objective location or waypoint), while satisfying performance constraints of the aerial vehicle. The trajectory planning systems and methods may also avoid dynamically any obstacles in the environment.

Trajectory planning systems and methods may be facilitated as a functional system within an aerial vehicle's flight-control system, whether an integrated/existing flight-control system or as an add-on in communication with an integrated/existing flight-control system. The aerial vehicle's flight-control system may also include systems such as, for example, obstacle detection systems, navigation systems (which may be autonomous), location tracking systems, etc. Obstacle detection may be facilitated by detecting one or more collision threats or obstacles (e.g., non-cooperative targets that are stationary and/or moving) using, inter alia, auditory techniques (e.g., an echolocation sensor), visual techniques (e.g., cameras, LiDAR, etc.), or a combination thereof. Examples of obstacles in the environment that may present collision threats include, without limitation, birds, people, other vehicles, structures (e.g., buildings, gates, towers, etc.), foliage (e.g., trees, bushes, etc.), and the like.

Trajectory planning methods may link together approximations of short trajectories by geometric arcs and line segments. As disclosed herein, trajectory planning systems and methods that take into account the aerial vehicle's position and velocity are useful for an aircraft with dynamic constraints. Trajectory planning methods may be grouped into one or more trajectory categories, including, inter alia, brute force checking, gradient descent, and rapidly exploring random tree (RRT).

Brute force trajectory methods involve considering the possible trajectories from the starting point to a short distance ahead, identifying a trajectory segment with the least cost that moves the aerial vehicle towards the objective, choosing that segment, and repeat that process from the end of the segment. The brute force trajectory cycle continues until the segments arrive at the objective (e.g., an objective location or waypoint). Brute force methods can be fast and can create feasible trajectories; however they are not able to avoid obstacles in the environment easily and dynamically.

Gradient descent trajectory methods involve starting with estimates at a trajectory, then use mathematical models for gradient descent to calculate a trajectory that does not violate physical constraints, including the vehicle's capability, while still arriving at an objective. The original guesses gradually approach a solution that satisfies constraints and avoids obstacles. Gradient descent for trajectory planning, however, may not consistently identity a trajectory, even when a possible trajectory exists. Therefore, gradient descent is not always reliable enough in practice, even in benign environments (e.g., environments relatively void of obstacles).

RRT trajectory methods attempt to link a start state and an end state with randomized states in the environment. Given enough time, RRTs have been shown to approach the optimal solution (provided a solution exists). While RRTs generally have good performance in practice, they can take too much time to generate acceptable trajectories when updates to trajectories require frequent updates with time limitations.

The present disclosure, however, provides a trajectory planning solution that improves upon the current state of the art of trajectory planning. In one aspect, a trajectory planning solution may use a path theory, such as the Dubins path theory, to reduce the computation time of generating complex trajectories. A Dubins path typically refers to the shortest curve that connects two points in a two-dimensional Euclidean plane (i.e., the x-y plane) with a constraint on the curvature of the path and with prescribed initial and terminal tangents to the path. In a Dubins path, the vehicle may also be assumed to travel only in a forward direction.

The disclosed trajectory planning solution may further involve integrating an iterating Dubins path for turning radius changes occurring with changes in velocity. The trajectory planning solution may use a brute force method to generate an initial trajectory to provide "seed" trajectories to a RRT algorithm, which then links, or attempts to link, the seed trajectories. In other aspects, other goal finding algorithms may be used in place of the RRT, such as RRT*, RRT #, A*, D*, Dijkstra's Algorithm, or rapidly exploring random tree. Further, in some aspects, methods other than the iterative Dubins path algorithm may be used to find possible arc lengths and short trajectory segments. In some aspects, an RRT algorithm or another goal finding algorithm may use the trajectories calculated by the iterative Dubins path algorithm without first using the brute force method to generate seed trajectories. The RRT and RRT* algorithms are described in greater detail by Sertac Karaman and Emilio Frazzoli, Incremental Sampling-based Algorithms for Optimal Motion Planning, International Journal of Robotics Research (2010).

The disclosed trajectory planning solutions offer a number of benefits, such as reduced computation time for generating complex trajectories through Dubins paths, reduced computation time for RRT algorithms through the use of seed trajectories, optimized results from the RRT solution through the use of seed trajectories, and the reliable avoidance of obstacles. In one aspect of the disclosure, the trajectory planner employs an iterative Dubins path.

A basic Dubins path uses a single turn radius to determine the path from one state to another, under the assumption that the turn radius does not change over time. However, the turn radius for an aerial vehicle is determined by velocity and a coordinated turn assumption. Since velocity for an aerial vehicle can change, the turn radius can change, thus changing the turn radius of the Dubins path. In the case of the disclosed trajectory planner, which generates trajectories from takeoff to landing, the accelerations will change velocities and thus affect the turn radius at any given time. Therefore, to account for changing velocities (and therefore changing turn radii), the trajectory planner may employ an iterative Dubins path algorithm.

An iterative Dubins path algorithm begins with the starting position, ending position, and the associated headings and velocities at those positions as inputs. From those inputs, the iterative Dubins path algorithm: 1) calculates the turning radius from the largest of the velocity of the start and end states; 2) calculates the basic Dubins path; 3) calculates the closest achievable velocity to the commanded velocity based on the kinematic constraints of the aerial vehicle; 4) calculates a turn radius based on the velocity achievable calculated in step 3; 5) calculates a Dubins path using the start and end turn radius; and 6) repeats steps 3-5 until the velocity calculated in step 3 does not change between iterations, or for a maximum predetermined number of iterations. The iterative Dubins path method can be used to generate an approximation of a trajectory that closely resembles the path of an aerial vehicle in flight.

The Dubins path iterations create short trajectories that the brute force method can use to create a simple trajectory to the objective end point. The brute force algorithm breaks the waypoint path into short segments, and links the segments together by short Dubins path trajectories. For example, the brute force trajectory can be used as a representative trajectory for a modified RRT algorithm to link as seed waypoints. In one example, a modified RRT algorithm: 1) links (or attempts to link) the initial state to the seed waypoints; 2) checks whether the waypoints go to the objective end point (if the waypoints go to the objective end point then the first solution is identified, and if not, the algorithm links (or attempts to link) the end of the seeds to the objective for the first solution); 3) picks a random state and adds to the tree according to the RRT algorithm; 4) links (or attempts to link) the random point to the seed waypoints; 5) checks if the waypoints go to the objective end point (if the waypoints go to the objective end point then a solution is determined, and if not, the algorithm links (or attempts to link) the end of the seeds to the objective for a solution); 6) repeats steps 3-5 until a solution is determined, a maximum number of iterations is reached, or a minimum number of iterations is reached after finding a solution; and 7) executes smoothing to reduce the length of the trajectory.

The seed waypoints calculated by the brute force method help the modified RRT efficiently find a reasonable path to the objective end point. While seed waypoints calculated by the brute force algorithm may not avoid obstacles, the RRT can find sections of the path to maneuver around obstacles, and link back to the seed waypoints after the obstacles are avoided. It should be recognized that the described methods and systems, although referring to trajectory planning, may also be used for route planning. Route planning is similar to trajectory planning, although when route planning, velocity and time components of the trajectory are unnecessary. Therefore, route planning can be accomplished using the disclosed methods and systems without considering time components or velocity.

FIG. 1 illustrates an example environment 100 for trajectory planning for an aerial vehicle at a starting point 102, including obstacle avoidance systems and methods. The environment 100 may include an objective 104 and any number of obstacles (e.g., trees 110, buildings 112, and utility poles 114). The direct path 106 illustrates a most direct route between the starting point 102 and the objective 104 (i.e., a liner path), however, the various obstacles mentioned above physically block the aerial vehicle from taking the direct path 106. Therefore, an aerial vehicle travelling from the starting point 102 to the objective 104 may need to calculate a possible and efficient trajectory between starting point 102 and objective 104. As described herein, an aerial vehicle may contain a trajectory planner, either alone or as part of a navigation system or flight control system, which can use the disclosed methods to efficiently find a feasible and low cost trajectory 108 between starting point 102 and objective 104.

To calculate a trajectory between the starting point 102 and the objective 104, first, an iterative Dubins path accounts for varying accelerations throughout the trajectory. Second, a brute force calculation, using the iterative Dubins paths calculations and ignoring obstacles, can be executed to find seed waypoints. The seed waypoints are then used by a modified RRT algorithm. The modified RRT algorithm, in addition to the normal sampling of an unmodified RRT, also links (or attempts to link) the seed waypoints to find a path between starting point 102 and objective 104 that avoids obstacles. Once the modified RRT algorithm finds a trajectory 108 between the starting point 102 and the objective 104, the trajectory planner executes smoothing in order to shorten the trajectory 108.

Figure 2A:
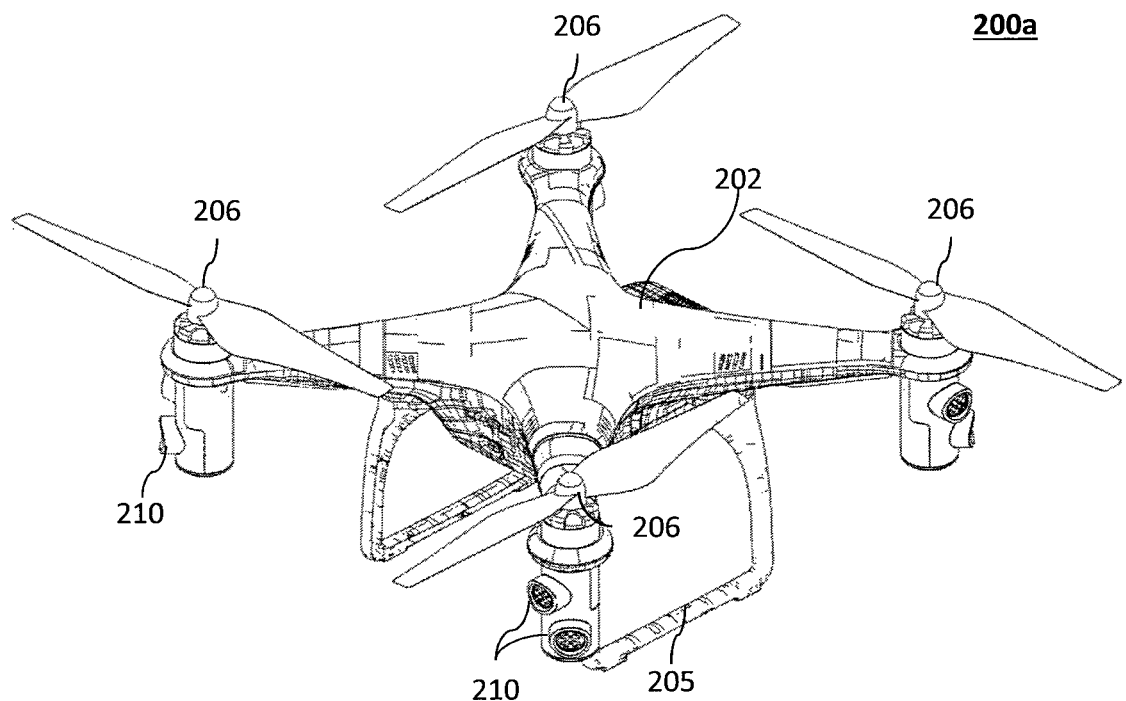
FIG. 2a illustrates a first example aerial vehicle having a trajectory planning system.
Figure 2B:
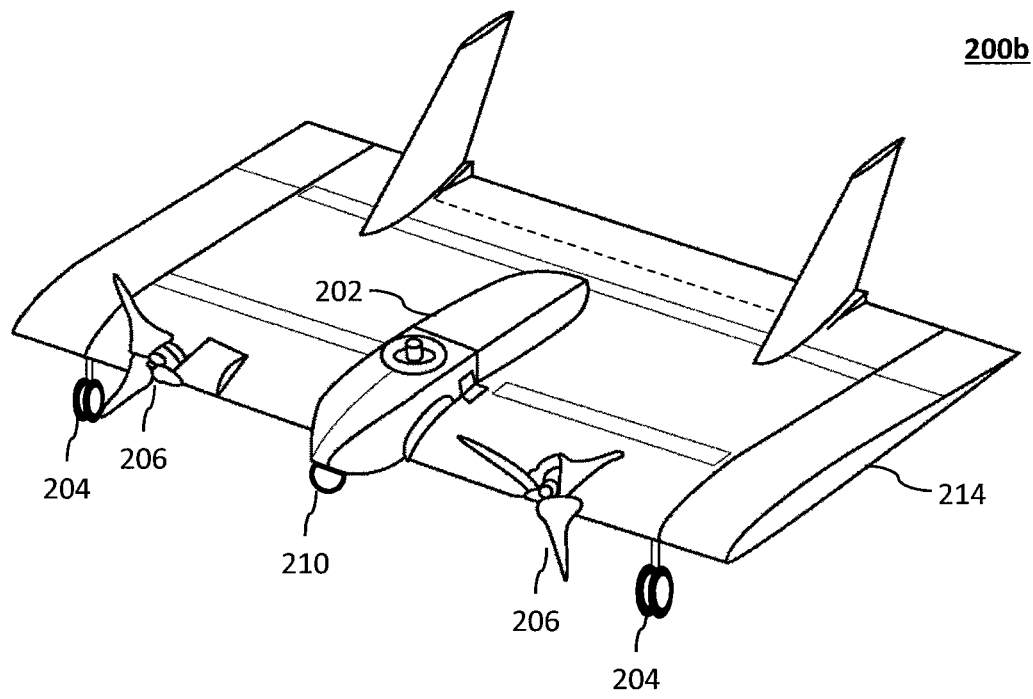
FIG. 2b illustrates a second example aerial vehicle having a trajectory planning system.

FIGS. 2a and 2b illustrate perspective views of two example aerial vehicles 200a, 200b. FIG. 2a illustrates an exemplary autonomous multirotor aerial vehicle 200a (illustrated as a quadcopter) capable of vertical take-off and landing, while FIG. 2b illustrates a fixed wing aircraft 200b. In either case, the aerial vehicles 200 may comprise an airframe 202 (e.g., a fuselage or chassis), landing gear 204, an electronics module 220 (best illustrated in FIG. 2c), and one or more thrust generators 206 to provide lift or thrust (e.g., a turbine, a motor or engine operatively coupled with a propeller, etc.). The electronics module 220 may be integrated with the airframe 202, or provided via a separate housing or pod. In the case of the multirotor aerial vehicle 200a, the thrust generators 206 may be coupled to the airframe 202 via a plurality of rotor booms 212. In the case of the fixed wing aircraft 200b, one or more fixed wings 214 may be coupled to the airframe 202. While the one or more fixed wings 214 may be distinct from the airframe 202, the fixed wing aircraft 200b may instead be configured as a blended-wing or flying-wing configuration.

The aerial vehicle may comprise one or more sensors 210 (e.g., as part of the ISR payload or separately therefrom), such as echolocation sensors, which generally function by emitting a sound frequency into an environment and detecting any echoes of the sound frequency that return from obstacles near the echolocation sensors. Using the strength of the echo and/or direction of echo's return, the echoes may be used to locate and/or identify obstacles, which in turn may cause the aerial vehicle to change direction so as to avoid collision with one or more obstacles. The sensors 210, however, are not limited to echolocation sensors and may include, inter alia, any vision-based sensor or acoustic sensor known in the art or that will become known in the art, including, without limitation, cameras, radar, LIDAR, and the like. In one aspect, cameras may be used to identify larger objects through three-dimensional reconstruction techniques such as optical flow. While this may provide useful information for autonomous navigation, the processing latency associated with optical imaging, as well as the sensitivity to the visibility of various types of objects, may limit the utility of optical sensing techniques for detecting small, rapidly approaching objects in a line of flight of a vehicle.

The sensors 210 may be positioned to obtain a field of view in the aerial vehicle's direction of travel, thereby identifying potential obstacles in the aerial vehicle 200's path. For example, a single sensor 210 (or single group of sensors 210) may be provided at the front of the aerial vehicle 200 to detect a threat of collision (e.g., obstructions or obstacles) in the path of the aerial vehicle 200. By orienting the sensors 210 toward the line of flight, acoustic detection may supplement optical detection and be used for detecting immediate obstructions that should trigger the execution of responsive maneuvers by a vehicle. Moreover, as demonstrated by the autonomous multirotor aerial vehicle 200a, a plurality of sensors 210 (or multiple groups of sensors) may be positioned around the perimeter (and/or top and bottom) of the aerial vehicle 200 to provide a field of view that is oriented with the aerial vehicle 200's line of flight. Accordingly, the plurality of sensors 210 would enable the aerial vehicle 200 to detect a threat of collision on any side of the aerial vehicle 200.

It will be appreciated that one purpose of the acoustic sensors is to provide immediate detection of obstacles directly in a flight path (or other line of travel), particularly obstacles that might not be detected using visual detection or other techniques. Correspondingly, it should be appreciated that one purpose of the sensors 210 is to provide immediate detection of obstacles in a specific direction (e.g., any direction of the aerial vehicle), particularly obstacles that might not be readily detected using visual detection or other techniques. While an echolocation array operates well in this context, other sensor systems may also, or instead, be suitably employed for rapid, accurate detection of obstacles, such as laser-based techniques or any other suitable techniques using optical, acoustic, radio frequency, or other sensing modalities. Any such technique suitable for implementation in an autonomous vehicle and capable of accurately and quickly identifying obstructions may be used in place of the echolocation sensors in the systems and methods contemplated herein. For example, the dynamic collision-avoidance system may employ a combination of vision- and acoustic-based sensors.

Figure 2C:
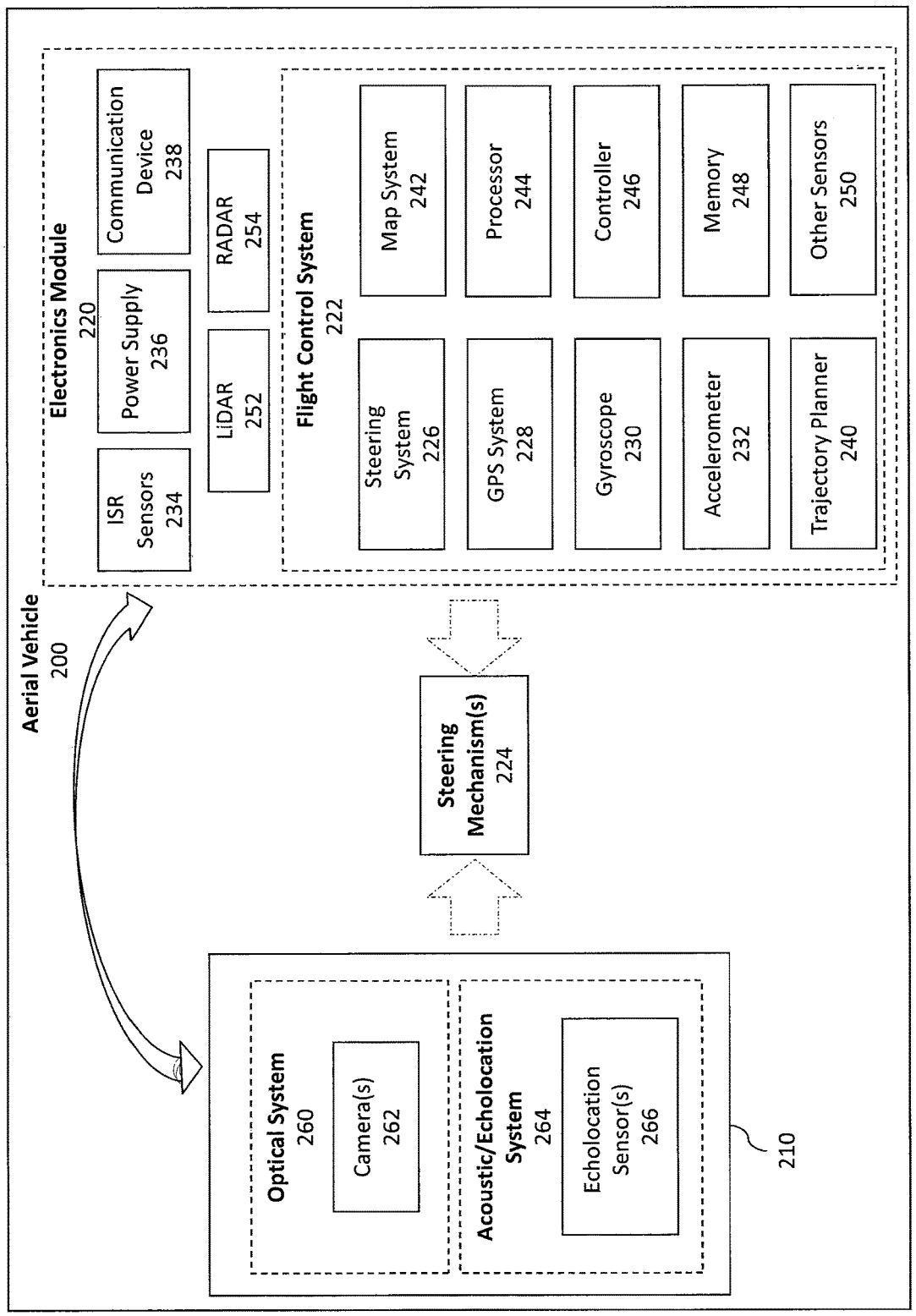
FIG. 2c illustrates a block diagram of a flight-control system including a trajectory planner for an aerial vehicle.

FIG. 2c illustrates a block diagram of an aerial vehicle 200 having a flight-control system 222, an electronics module 220, a sensor payload 210 (e.g., the optical system 260, and/or the acoustic/echolocation system 264), a steering mechanism 224. Generally, an electronics module 220 may be used to house the aerial vehicle's avionics, power supply (e.g., a propulsion battery), sensor payload, and communication device or system. For example, the electronics module 220 may be used to house, or otherwise contain, the aerial vehicle's flight-control system 222, power supply 236, and communication device(s) 238. The electronics module 220 may further comprise an intelligence, surveillance, reconnaissance ("ISR") payload 234 for gathering data, a LiDAR sensor 252, RADAR sensor 254, or other sensors. For example, the aerial vehicle 200 may be equipped with an ISR payload 234 pod comprising one or more cameras, audio devices, and other sensors. Any video, image, audio, telemetry, and/or other sensor data ("Surveillance Data"), collected by the aerial vehicle 200 may be locally stored or wirelessly communicated from the aerial vehicle 200 to a remote location in real time using an antenna coupled with an onboard wireless communication device, such as a transmitter/receiver. Alternatively, Surveillance Data may be communicated, or otherwise transferred, to the remote location or another party via a wired connection (e.g., when tethered, or on the ground, post operation).

While FIG. 2c illustrates a particular arrangement, it will be understood that the arrangement of components may be adjusted to achieve a desired objective. For example, the flight-control system 222 may be located within one or more dedicated housings and/or removable from the aerial vehicle 200. In another example, to reduce size, weight, power and cost (SWaP-C), components (e.g., hardware) may be shared between the ISR 234 and the sensor payload 210. The electronics module 220 may be integrated with the airframe 202 or contained within a separate housing, which may also potentially providing rigidity to the airframe 202. Therefore, the electronics module 220 may be removable from and replaceable to the airframe 202, and may house any systems or subsystems of flight-control system 222 and navigational methods as contemplated herein. The electronics module 220 may comprise electronics and hardware used to support, or facilitate, the navigation and trajectory planning methods. The flight-control system 222 may be coupled in a communicating relationship with the aerial vehicle 200 and a remote location and may be configured to send and receive signals to and from the aerial vehicle 200 and the remote location via communication device 238. Communication device 238 may be, for instance, a wireless transceiver and antenna.

The flight-control system 222 may be communicatively coupled with the one or more steering mechanisms 224 and the sensor payload 210 (e.g., the optical system 260, and/or echolocation system 264). The flight-control system 222 may include a steering system 226, a GPS system 228, a gyroscope 230, an accelerometer 232, a trajectory planner 240, a map system 242, a processor 244, a controller 246, and/or a memory 248. The flight-control system 222 may also include the components described above as being disposed within the electronics module 220, as well as other sensors 250, such as any other conventional flight instrumentation, sensors, processing circuitry, communications circuitry, optical system including cameras and the like, necessary or useful for operation of an unmanned aerial vehicle or other autonomously or manually piloted vehicle.

The flight-control system 222 may be used to control and/or navigate the aerial vehicle 200. For example, the flight-control system 222 may identify one or more navigational paths for the aerial vehicle 200 to reach a desired location based upon signals received from the components of a navigation system. More specifically, the flight-control system 222 may calculate, generate, and send navigation commands (e.g., data signals) to the steering mechanism 224, via the steering system 226, to direct the aerial vehicle 200 along a navigational path to the desired location.

In operation, the flight-control system 222 may identify and/or instruct the aerial vehicle 200 to follow a navigational path in order to reach a desired location based upon signals received from the components of the navigation system. For example, the steering system 226 may be configured to receive signals from a component of the flight-control system 222 and to provide suitable control signals to the steering mechanism 224 of the aerial vehicle in order to direct the aerial vehicle 200 along an intended route. Indeed, the flight-control system 222 is generally configured to direct, or otherwise control, one or more steering mechanisms 224 within an aerial vehicle 200. The flight-control system 222 may facilitate autopilot functionality and/or respond to remote navigation commands. To that end, the flight-control system 222 may communicatively couple the aerial vehicle 200 with a remote location, and may be configured to send and receive signals between (e.g., to and from) the aerial vehicle 200 and the remote location (e.g., via communication device 238). Functionality of the navigational module may be distributed in any suitable manner between components in the flight-control system 222, components elsewhere in the aerial vehicle 200, and/or remotely located components. Moreover, a suitable electronic, mechanical, and communication interface may be provided to facilitate removal and replacement of the electronics module to the airframe 202.

The flight-control system 222 may be disposed wholly or partially inside a separate housing, inside the airframe 202, or some combination thereof. For example, The flight-control system 222 may attach to an exterior of a vehicle, or be disposed wholly or partially within the aerial vehicle. The flight-control system 222 need not be a separate physical item on the aerial vehicle, but rather may be a component of a larger navigation system or may itself include all of the components of the navigation system. In some examples, the flight-control system 222 may be integrated into the aerial vehicle 200 and coupled in a communicating relationship with the electronics module 220 and/or steering mechanism 224. The flight-control system 222 may, in certain embodiments, share components, such as memory, sensors, processors, or controllers. Further, the electronics module 220 may be irremovably coupled to the aerial vehicle 200 or integrated into the airframe 202 or wing 212 of the aerial vehicle 200 in any desired manner. Thus, the arrangement of the various components may be configured as desired by the designer or operator and therefore should not be limited to a particular example described or illustrated herein. The flight-control system 222 may be a removable and replaceable package or a module that is removable from and replaceable to the aerial vehicle, or be permanently coupled to or integrated into the aerial vehicle.

The steering mechanism 224 may be configured to steer the aerial vehicle 200 (whether autonomously or under manned control) on a navigational path to reach an objective as contemplated herein.

The aerial vehicle 200 may be any vehicle referenced herein or otherwise known in the art (or as will be known in the art). Similarly, the steering mechanism 224 may be any form of steering referenced herein or otherwise known in the art (or as will be known in the art). In general, the steering mechanism 224 responds to signals from the flight-control system 222, which may employ feedback or other control systems to accurately direct the aerial vehicle 200 along an intended route. The steering mechanism 224 may be configured to facilitate controlled flight of the aerial vehicle 200 by, in response to a navigation command, adjusting roll, pitch, and yaw. To that end, a steering mechanism 224 may be operatively coupled with a controller or include one or more processors, actuators, motors, and/or other devices (e.g., electrical or electromechanical devices) capable of receiving and responding to a navigation command from the steering system 226.

Exemplary steering mechanisms 224 include, without limitation, traditional flight-control surfaces (e.g., flaps, ailerons, elevators, rudders, spoilers, air brakes, and/or other flight-control surfaces), as well as other flight-control mechanisms, such as vectored-thrust control systems. Vectored-thrust control functionality may be facilitated by moving the thrust generators 206 to direct the thrust in a desired direction, thus controlling flight. For instance, an articulated, electric motor arrangement may employ vectored-thrust control to directly change the thrust vector. Indeed, independently articulating thrust-vectoring motor pods allow rapid transition between vertical and horizontal flight. In certain aspects, the aerial vehicle 200 may further comprise two or more fins (e.g., vertical stabilizers, and/or horizontal stabilizers), particularly with regard to fixed-wing aerial vehicles.

The steering mechanism 224 may more generally include rudders, elevators, flaps, ailerons, spoilers, air brakes, and other control surfaces. For other aerial vehicles, such as a helicopter, the steering mechanism 224 may include a number of rotors, which may be fixed rotors or steerable rotors, along with foils and other control surfaces. For land-based vehicles, the steering mechanism 224 may include a rack and pinion system, variably rotatable treads, a recirculating ball system, and the like. The steering mechanism 224 may also, or instead, include any components to provide thrust, acceleration, and deceleration of the aerial vehicle 200, along with directional control. While vehicles may generally use separate or integrated components for drive and direction, all such combinations that facilitate control over movement of a vehicle are intended to fall within the scope of a "steering mechanism" as contemplated herein.

The GPS system 228 may be part of a global positioning system configured to identify a position of the electronics module 220 or the aerial vehicle 200. The GPS system 228 may include any GPS technology known in the art or that will become known in the art, including conventional, satellite-based systems as well as other systems using publicly or privately operated beacons, positional signals, and the like. The GPS system 228 may include one or more transceivers that detect data for use in calculating a location. The GPS system 228 may cooperate with the other components of the flight-control system 222 to control operation of the aerial vehicle 200 and navigate the aerial vehicle along an intended path.

The gyroscope 230 may be a device configured to detect rotation of the electronics module 300 or the aerial vehicle 200 to which the electronics module 220 is coupled. The gyroscope 230 may be integral with the aerial vehicle 200 or it may be disposed inside or outside of the electronics module 220 housing. The gyroscope 230 may include any gyroscope or variations thereof (e.g., gyrostat, microelectromechanical systems ("MEMS"), fiber-optic gyroscope, vibrating-structure gyroscope, dynamically tuned gyroscope, and the like) known in the art or that will become known in the art. The gyroscope 230 may cooperate with the other components of the flight-control system 222 to control operation of the aerial vehicle 200 and navigate the aerial vehicle along an intended path.

The accelerometer 232 may be any device configured to detect a linear motion of the electronics module 220 or the aerial vehicle 200. The accelerometer 232 may be integral with the aerial vehicle 200 or it may be disposed inside or outside of the electronics module 300 housing. The accelerometer 232 may include may include any accelerometer known in the art (e.g., capacitive, resistive, spring-mass base, direct current ("DC") response, electromechanical servo, laser, magnetic induction, piezoelectric, optical, low frequency, pendulous integrating gyroscopic accelerometer, resonance, strain gauge, surface acoustic wave, MEMS, thermal, vacuum diode, and the like) or that will become known in the art. The accelerometer 232 may cooperate with the other components of the flight-control system 222 to control operation of the aerial vehicle 200 and navigate the aerial vehicle along an intended path.

The map system 242 may be part of a map-based flight-control system that provides positional information about natural and manmade features within an area. This may include information at any level of detail including, e.g., topographical maps, general two-dimensional maps identifying roads, buildings, rivers, and the like, or detailed, three-dimensional data characterizing the height and shape of various natural and manmade obstructions such as trees, sculptures, utility infrastructure, buildings, and so forth. In one aspect, the map system 242 may cooperate with an optical system for visual verification of surrounding context or the map system 242 may cooperate with the GPS system 228 to provide information on various obstacles within an environment for purposes of path determination or the like. In one aspect, the map system 242 may provide a supplemental navigational aid in a GPS-denied or GPS-impaired environment. When GPS is partially or wholly absent, the map system 242 may cooperate with other sensors 250, such as optical sensors, inertial sensors, and so forth to provide positional information until a GPS signal can be recovered.

The map system 242 may more generally communicate with other components of the flight-control system 222 in order to support navigation of a vehicle as contemplated herein. While this may include providing map information for calculation of routes, this may also include independent navigational capabilities. For example, the map system 242 may provide a map-based navigation system that stores a map of an operating environment including one or more objects. The map-based navigation system may be coupled to cameras and configured to identify a position of a vehicle by comparing stored objects to a visible environment, which may provide position data in the absence of GPS data or other positional information.

The processor 244 may be coupled in a communicating relationship with the controller 246, the aerial vehicle 200, the flight-control system 222, the steering mechanism 304, and the other various other components, systems, and subsystems described herein. The processor 244 may be an internal processor of the aerial vehicle 200 or the flight-control system 222, an additional processor within the electronics module 300 to support the various navigational functions contemplated herein, a processor of a desktop computer or the like, locally or remotely coupled to the aerial vehicle 200, and the flight-control system 222, a server or other processor coupled to the aerial vehicle 200 and the flight-control system 222 through a data network, or any other processor or processing circuitry. In some examples, the aerial vehicle 200 may include an optical system 260 including at least one camera and/or an echolocation system 264 including at least one echolocation sensor 266. The flight control system 222 may receive information from the optical system 260 and/or the echolocation system 264. In general, the processor 244 may be configured to control operation of the aerial vehicle 200 or the flight-control system 222 and perform various processing and calculation functions to support navigation. The processor 244 may include a number of different processors cooperating to perform the steps described herein, such as where an internal processor of the aerial vehicle 200 controls operation of the aerial vehicle 200 while a processor in the housing preprocesses optical and echolocation data.

The processor 244 may be configured to identify or revise a navigational path for the aerial vehicle 200 to a location based upon a variety of inputs including, e.g., position information, movement information, dynamic collision-avoidance system 302 data, and so forth, which may be variously based on data from the GPS system 228, the map system 242, the gyroscope 230, the accelerometer 232, and any other navigation inputs, as well as an optical system and the echolocation system, which may provide information on obstacles in an environment around the aerial vehicle 200. An initial path may be determined, for example, based solely on positional information provided by the GPS system 228, with in-flight adjustments based on movements detected by the gyroscope 230, accelerometer 232, and the like. The processor 244 may also be configured to utilize an optical navigation system, where the processor is configured to identify a visible obstacle within the field of view (FOV) of an optical system; for example, using optical flow to process a sequence of images and to preempt the GPS system 228 to navigate the aerial vehicle 200 around visible obstacles and toward the location. The processor 244 may be further configured to identify an obstacle within the FOV of the dynamic collision-avoidance system 302, usually within a line of flight of the aerial vehicle, and further configured to preempt the GPS system 228 and the optical navigation system to execute a responsive maneuver that directs the aerial vehicle 200 around the obstacle and returns the aerial vehicle 200 to a previous course toward the location.

The controller 246 may be operable to control components of the aerial vehicle 200 and the flight-control system 222, such as the steering mechanism 304. The controller 246 may be electrically or otherwise coupled in a communicating relationship with the processor 244, the aerial vehicle 200, the flight-control system 222, the steering mechanism 304, and the other various components of the devices and systems described herein. The controller 246 may include any combination of software and/or processing circuitry suitable for controlling the various components of the aerial vehicle 200 and the flight-control system 222 described herein, including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In certain aspects, the processor 244 may be integral with the controller 246. In one aspect, this may include circuitry directly and physically associated with the aerial vehicle 200 and the flight-control system 222, such as an on-board processor. In another aspect, this may be a processor, such as the processor 244 described herein, which may be associated with a personal computer or other computing device coupled to the aerial vehicle 200 and the flight-control system 222, e.g., through a wired or wireless connection. Similarly, various functions described herein may be allocated among an on-board processor for the aerial vehicle 200, the flight-control system 222, and a separate computer. All such computing devices and environments are intended to fall within the meaning of the term "controller" or "processor" as used herein, unless a different meaning is explicitly provided or otherwise clear from the context.

The memory 248 may include local memory or a remote storage device that stores a log of data for the flight-control system 222, including, without limitation, the location of sensed obstacles, maps, images, orientations, speeds, navigational paths, steering specifications, GPS coordinates, sensor readings, and the like. The memory 248 may also, or instead, store a log of data aggregated from a number of navigations of a particular vehicle, or data aggregated from a number of navigations of different vehicles. The memory 248 may also, or instead, store sensor data from an optical system 260 or echolocation system 264, related metadata, and the like. Data stored in the memory 248 may be accessed by the processor 244, the controller 246, a remote processing resource, and the like.

The trajectory planner 240 may calculate, via a processor (e.g., processor 244), a potential trajectory for the aerial vehicle 200 using an algorithm comprising, for example, an iterative Dubins path algorithm, a brute force algorithm, and an RRT algorithm (or variations thereof). The trajectory planner 240 may receive location coordinates from the GPS system 228, the map system 242, the controller 246, the memory 248 etc. The trajectory planner 240 may also receive obstacle information from the flight control system 222, including the map system 242, the memory 248, other sensors 250, or from information the flight control system received from the optical system 260 or the echolocation system 264, etc. The trajectory calculated by the trajectory planner 240 may be used by the flight control system 222 to output directions to the steering mechanism 224 via the steering system 226.

In certain aspects, a modular housing may encase one or more components of the aerial vehicle 200, such as the electronics module 220, the flight-control system 222, the optical system 260, and/or the acoustic/echolocation system 264. The modular housing may be constructed of plastic, metal, wood, a composite material, ceramic, or any material suitable for the purposes of a particular vehicle or type of vehicle. The modular housing may be detachable or ejectable, or it may be permanently coupled to the aerial vehicle 200. The modular housing may be attached to the aerial vehicle via one of more fasteners, including screws, clips, magnets, hook-and-loop fasteners (e.g., Velcro®), etc. The modular housing may include openings for sensors such as the sensors 210. The electronics module 220 may be used to house the aerial vehicle's 200 avionics (e.g., the flight-control system 206), power supply 236, sensor payload, such as an ISR payload 234, and communication device or system 238; and may be integrated with the airframe 202 or contained within a separate housing.

FIG. 3 illustrates an example optimal trajectory calculated, via the flight control system 222 (e.g., via the trajectory planner 240) for an aerial vehicle 200 along a waypoint path 306, the calculated trajectory being configured to avoid an obstacle 310 along the waypoint path 306. The aerial vehicle has a starting position 302, and an ending position 304. Ideally the aerial vehicle should follow the waypoint path 306. However, some aerial vehicles, such as fixed wing aircraft, may be incapable of turning exactly at points 312 and 314. Rather, a fixed wing or rotary wing aircraft has a turning radius calculable by its velocity, heading, and kinematic information. As such, an ideal calculated trajectory 308 along a waypoint path 306 including two turns 312 and 314 and avoiding an obstacle 310 is shown. Such a trajectory may be efficiently calculated via the trajectory planner 240 using the methods as described herein.

Figure 4:
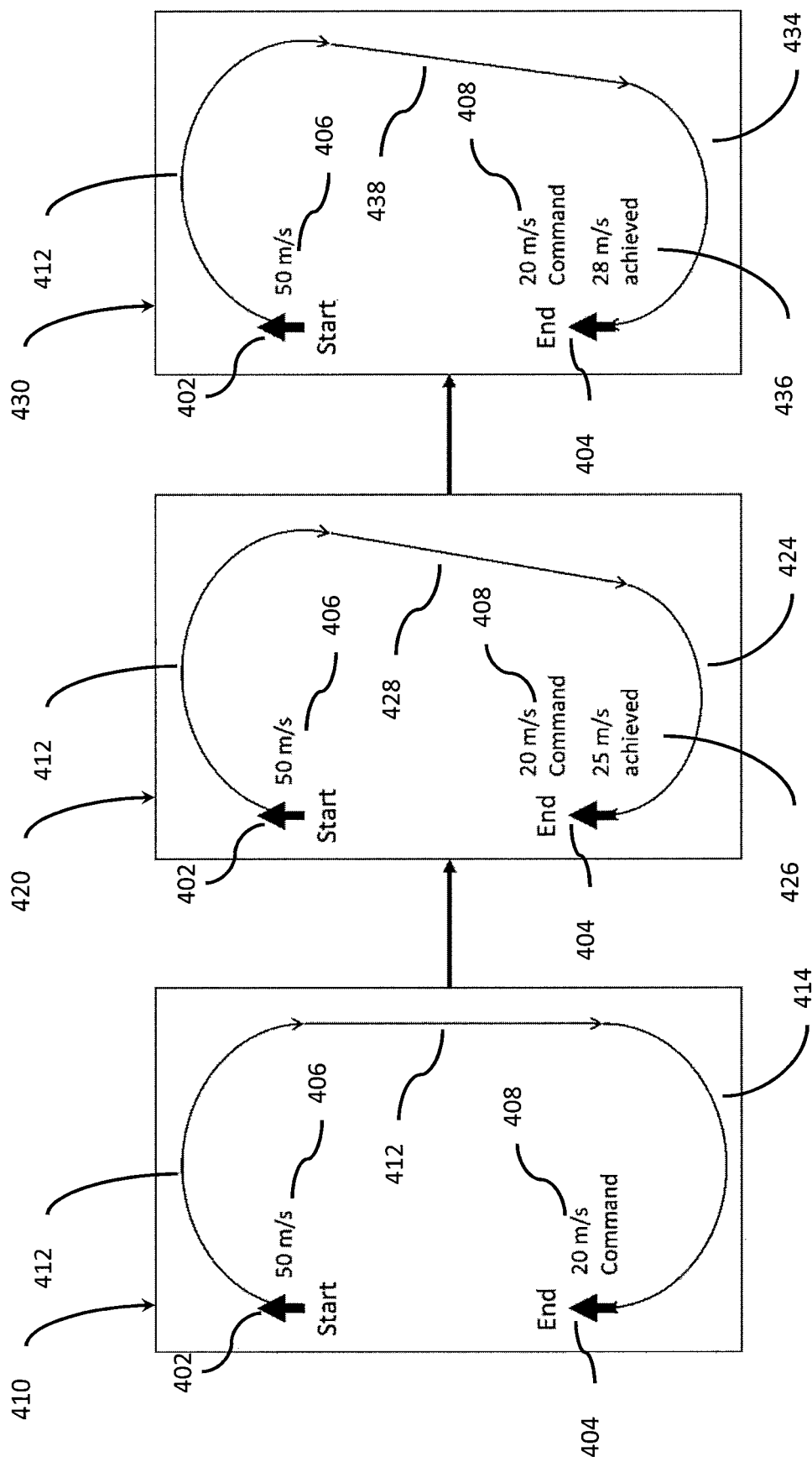
FIG. 4 illustrates an example of several iterations of the iterative Dubins path algorithm.

FIG. 4 illustrates an example of several iterations of the iterative Dubins path algorithm with two turns. An iterative Dubins path algorithm could also be used for a single turn waypoint path or with any number of turns. An iterative Dubins path algorithm with two turns, as shown in FIG. 4, begins at the starting position 402, heading and velocity 406 at the starting position 402, ending position 404, and the heading and velocity 408 at the ending position 404 as inputs. In the first iteration 410, the turn radii 412 and 414 are calculated from the largest velocity of the start state 402 and end state 404. Thus, the starting velocity 406 of 50 m/s is greater than the ending velocity 408 of 20 m/s, and the turning radii 412 and 414 are calculated according to the starting velocity 406 of 50 m/s. The Dubins path 412 can then be calculated according to the Dubins path algorithm. Then, as shown in iteration 420, with the distance from the Dubins path calculation, basis kinematics, and the kinematic limits of the aerial vehicle, the algorithm determines the closest velocity achievable 426 to the commanded end velocity 408. In the second iteration 420, the closest achievable velocity 425 is 25 m/s. Based on the new velocity achievable 426 of 25 m/s, a new end turn radius 424 is calculated. Then using the new end turn radius, a second Dubins path 428 is calculated.

As shown in step 430, the algorithm repeats this iterative process of 1) finding a new achievable velocity 436, 2) calculating a new second radius 434, and 3) calculating a new Dubins path until the achievable velocity 436 equals the commanded ending velocity 408, or in the alternative for a maximum predetermined number of iterations. Using this iterative Dubins path algorithm generates an approximation of a trajectory that closely resembles the path of an aerial vehicle in flight.

It should be noted that methods other than the iterative Dubins path algorithm may be used to compute the short segment arcs and straight lines. The results of these other methods may then similarly be input into the brute force method as described in more detail below in reference to FIGS. 5a and 5b. Further, in some examples, the trajectory planner may not iteratively compute the Dubins path, rather it may simply compute the first iteration of the Dubins path as disclosed above, and then use the results from the first calculated Dubins path as the trajectory segments for the brute force method described below in reference to FIGS. 5a and 5b.

Figure 5A:
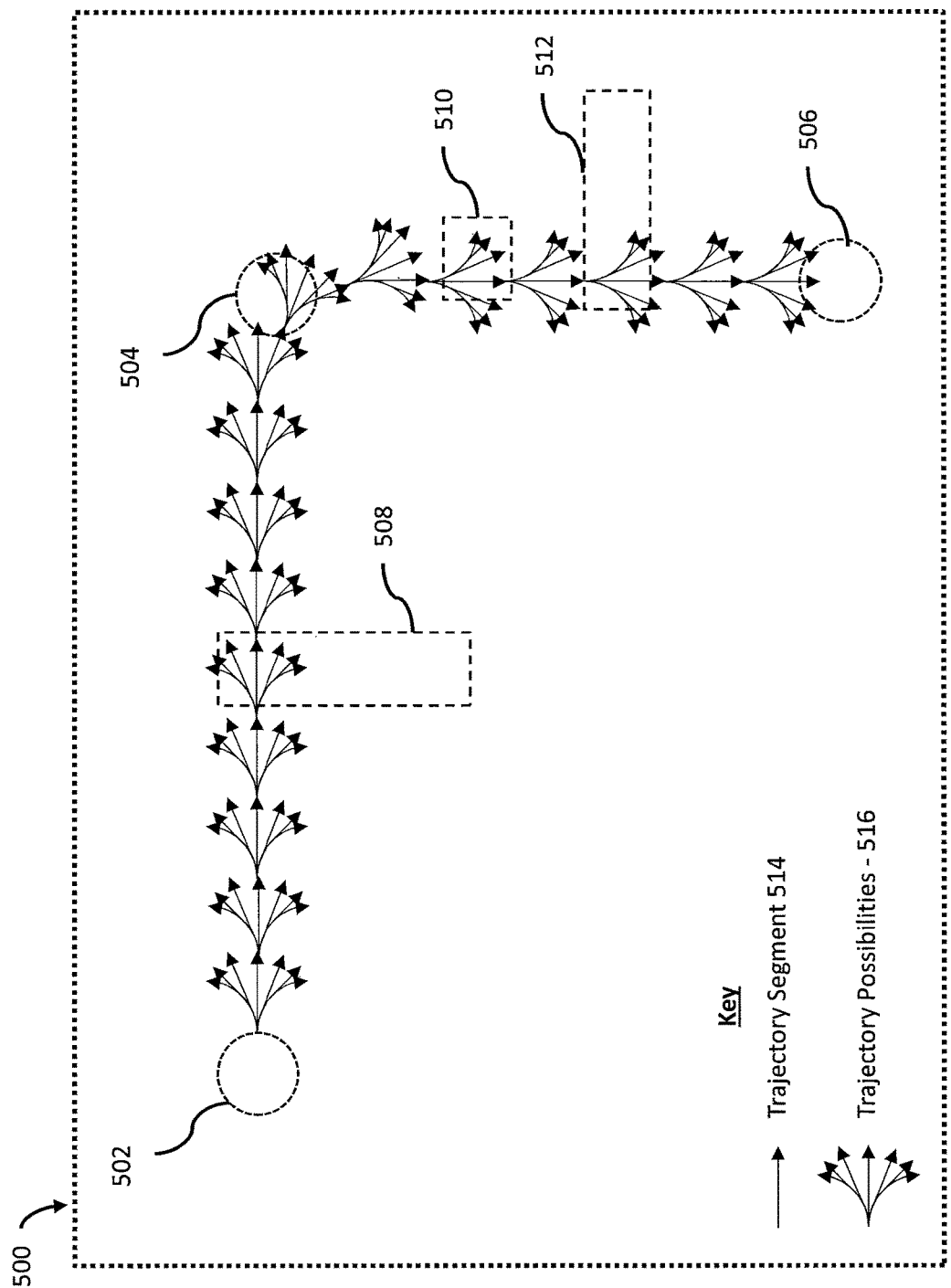
FIG. 5a illustrates an example of a brute force algorithm calculating a trajectory without avoiding obstacles.

FIG. 5a illustrates an example of using a brute force method to calculate a trajectory while ignoring obstacles. In environment 500, an aerial vehicle has a starting point 502. The trajectory planner may know that the aerial vehicle should pass through a waypoint 504, and reach the ending point 506. The brute force method identifies a least cost trajectory from the starting point 502 to the ending point 506 through the waypoint 504, while ignoring obstacles by checking possibilities at short segments 514 and choosing the possible segment with the least cost to the objective. Using the brute force method, the trajectory planner 240 identifies a trajectory segment 514 by checking one or more (e.g., each of) of the trajectory possibilities 516 from the starting point 502. From the starting point, the initial objective is the waypoint 504. Therefore, as shown in FIG. 5a, the trajectory planner 240 identifies and selects a trajectory segment 514 from the trajectory possibilities 516. It should be recognized that the example trajectory possibilities as shown in FIG. 5a are only examples, and do not indicate all possible trajectory segments the trajectory planner may choose from. Similarly, while the trajectory possibilities as shown in FIG. 5a are all of equal radii, as disclosed above, the trajectory planner may account for changing radii by using an iterative Dubins path algorithm. The trajectory planner 240 may then use the varying radii possibilities to calculate the brute force trajectory, however for simplicity in FIG. 5a, the radii as shown in the trajectory possibilities 516 are of equal length.

Once the trajectory planner chooses the least cost trajectory segment 514 to the waypoint 504, the trajectory planner repeats this process until the trajectory segments 514 reach the waypoint 504. Once the trajectory segments 514 reach the waypoint 504, the next objective is the ending point 506. The trajectory planner then repeats the same process until the trajectory segments reach the ending point 506.

Figure 5B:
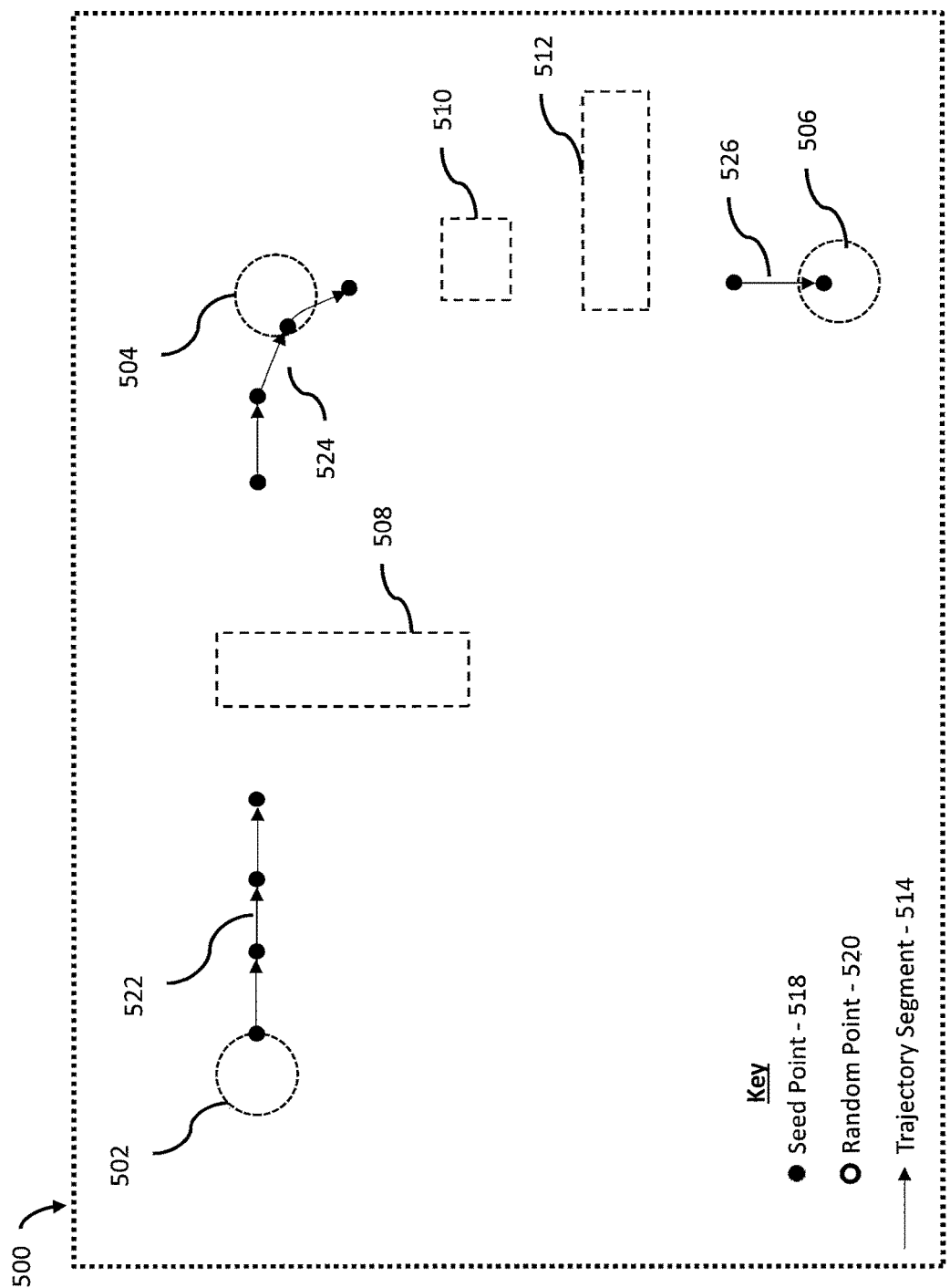
FIG. 5b illustrates a second of seed waypoints used to find initial trajectory segments.

FIG. 5b illustrates the first step the trajectory planner may take after calculating the brute force trajectory. The calculation of the brute force trajectory may be used to establish seed waypoints for an RRT algorithm. If trajectory segments were within a predetermined distance of one or more known obstacles, 508, 510, 512, the trajectory segments are not used as seed waypoints. The trajectory planner then links (or attempts to link) together the start point 502 to the seed waypoints 518 as shown in segment 522. The trajectory planner then attempts to connect seed waypoints to the ending point 506 as shown for segment 524. Further, the trajectory planner may attempt to link other seed waypoints as shown at segment 526.

Figure 5C:
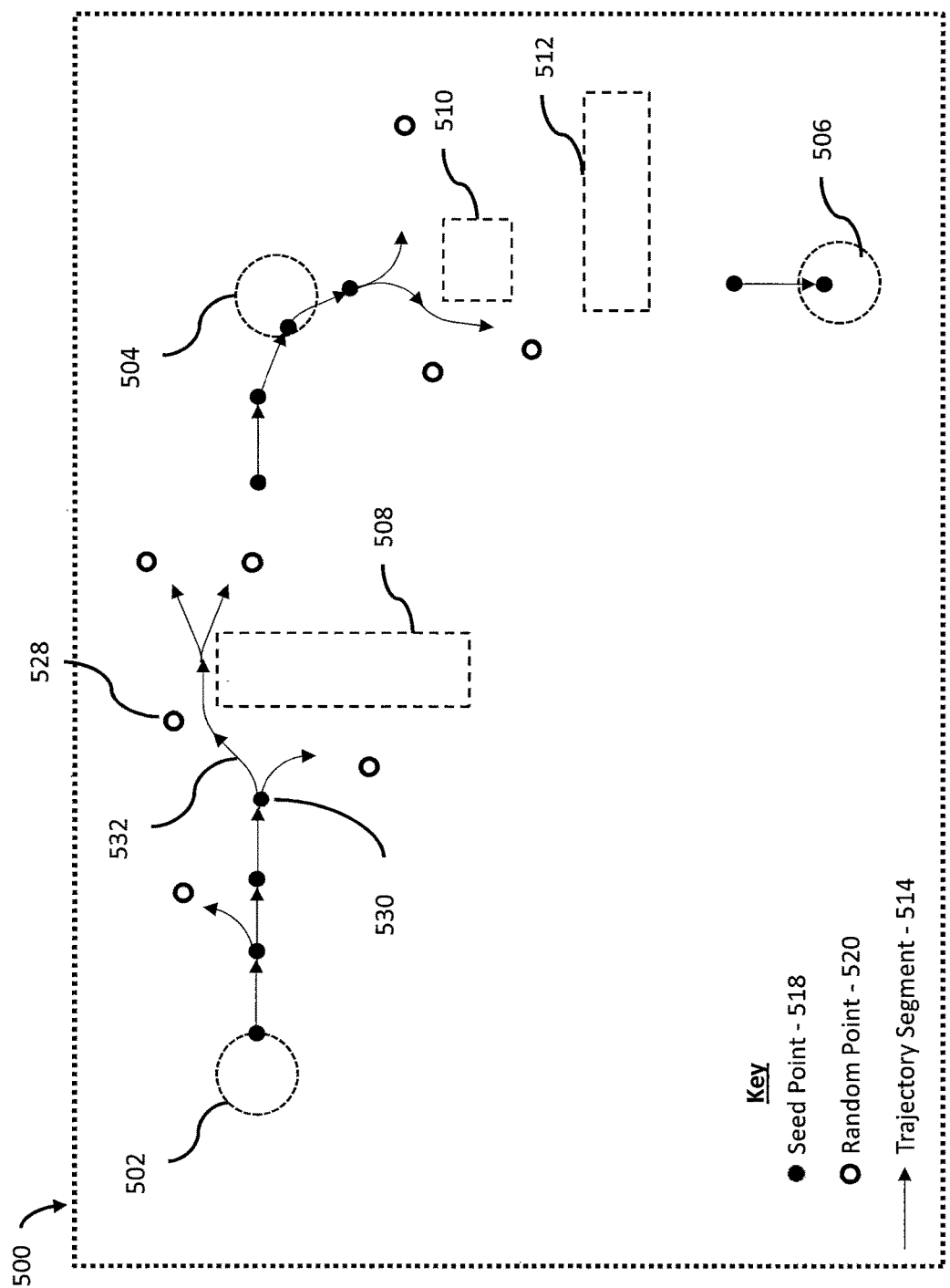
FIG. 5c illustrates an example execution of a rapidly exploring random tree algorithm in order to find a trajectory that avoids obstacles.

FIG. 5c illustrates the trajectory planner using a modified RRT algorithm to find a path between the start point 502 and the ending point 506 through the waypoint 504 while avoiding obstacles 508, 510, and 512. After linking together known segments as shown in FIG. 5b, the RRT algorithm picks a random point 520 in the environment 500. For example random point 528 may be randomly chosen by the trajectory planner executing the modified RRT algorithm. The trajectory planner executing the modified RRT algorithm then finds the trajectory segment endpoint 530 that is closest to the random point 528. The trajectory planner executing the modified RRT algorithm then finds the least cost trajectory segment 532 that goes to the direction of the random point 528. If no trajectory segment can be identified in the direction of a random point 520 that extends from an existing trajectory segment endpoint and does not pass through an obstacle, then no new trajectory segment is added corresponding to that random point. The process of using random points 520 to add trajectory segments 514 can be repeated until a path to the ending point 506 is identified, or in some examples, until a maximum number of iterations is reached.

FIG. 5d illustrates an example trajectory 534 identified via the processes described above. After the trajectory planner executes the modified RRT algorithm to find a path between the starting point 502 and the ending point 506, the trajectory planner may execute a smoothing algorithm to reduce the length of the trajectory 534. The trajectory 534 calculated using the above process avoids obstacles 508, 510, 512.

Figure 6A:
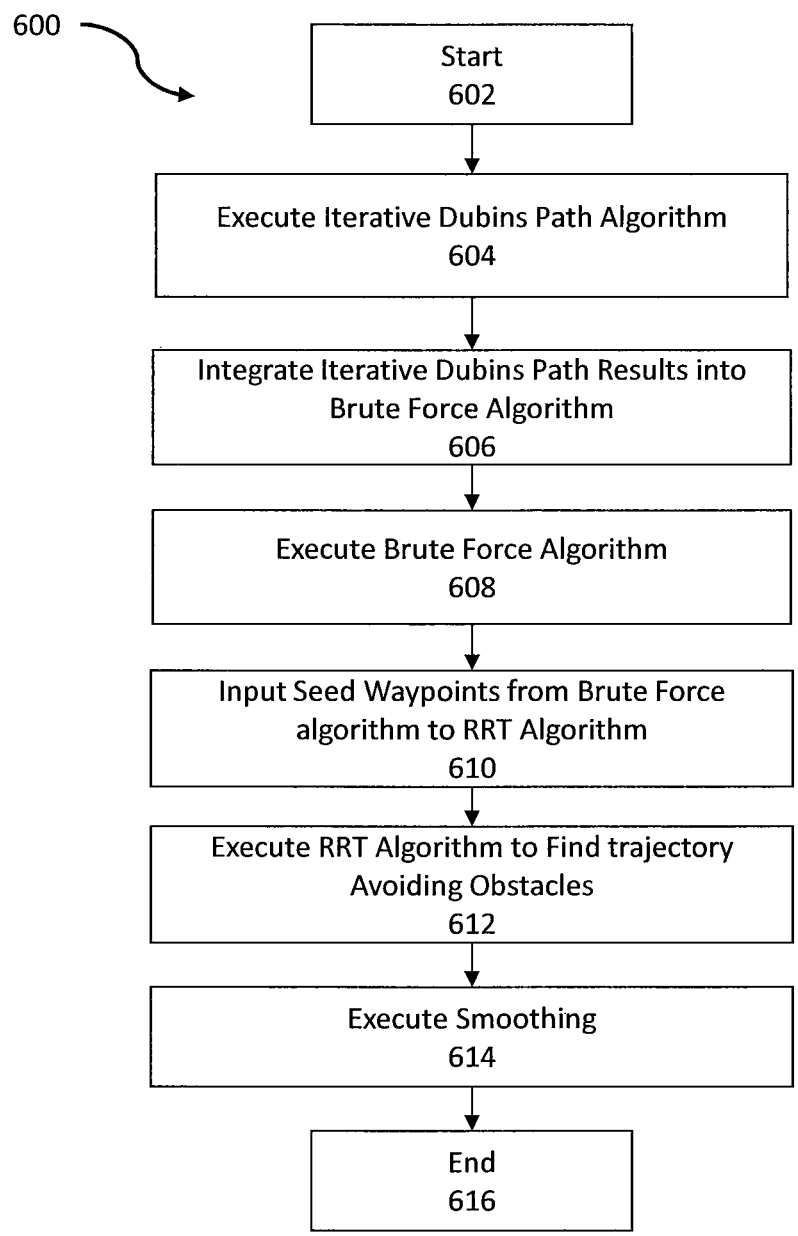
FIG. 6a illustrates a flow chart of an example trajectory planning method for an aerial vehicle.
Figure 6B:
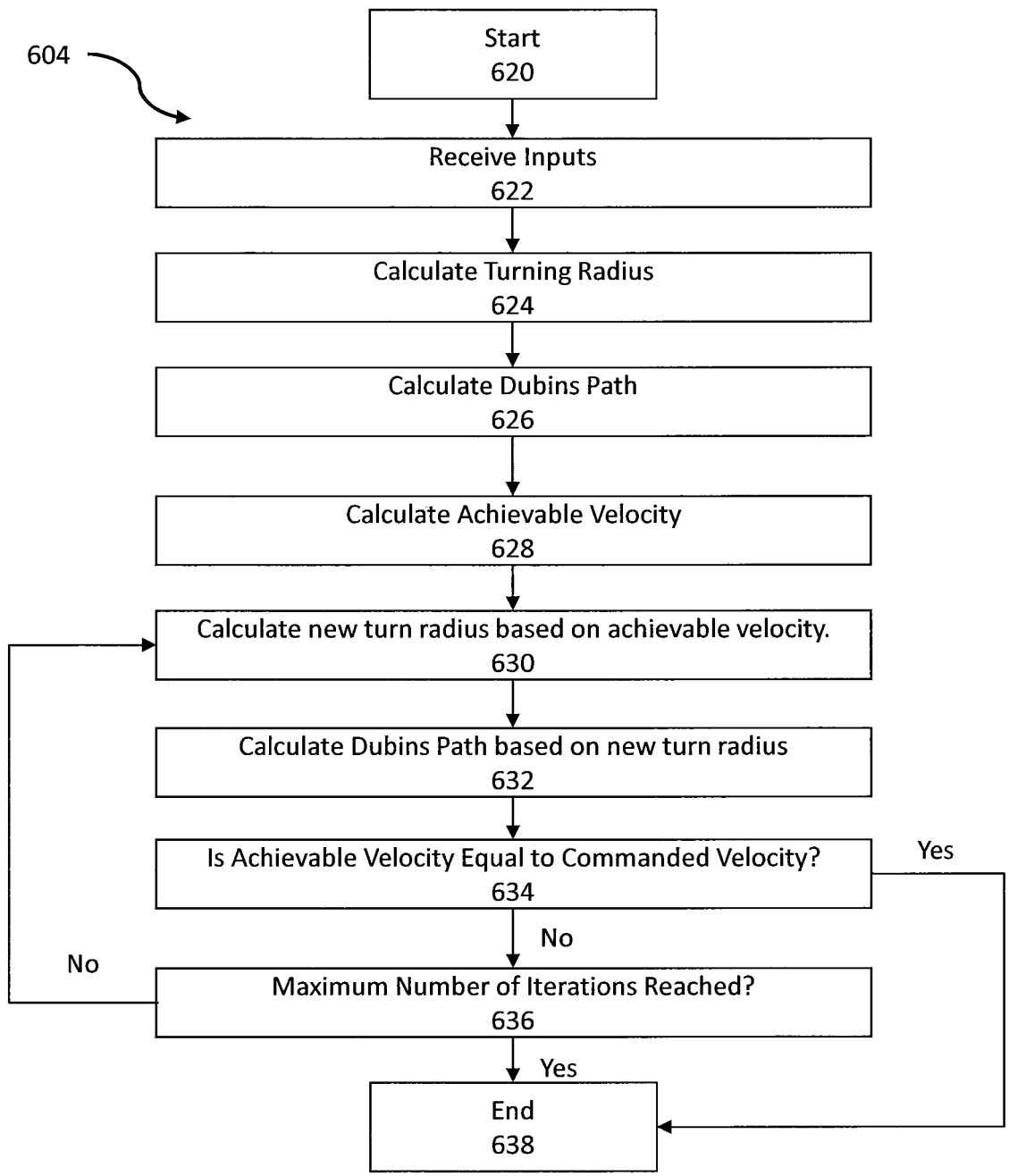
FIG. 6b illustrates a flow chart of an example method for iteratively calculating a Dubins path.
Figure 6C:
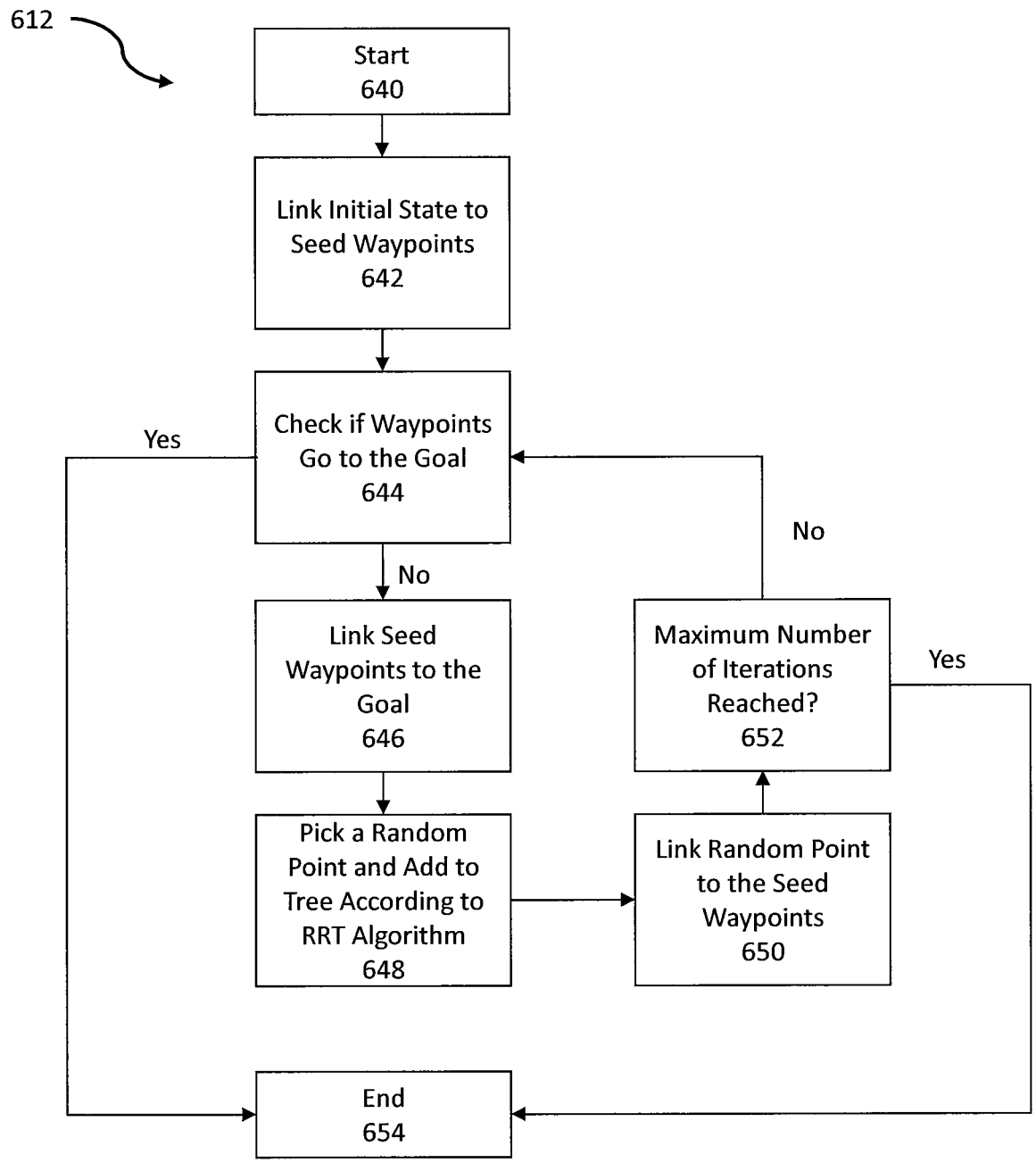
FIG. 6c illustrates a flow chart of an example method for using a rapidly exploring random tree algorithm to calculate a trajectory for an aerial vehicle.

FIGS. 6a, 6b, and 6c illustrate an example method that can be used to calculate a trajectory for an aerial vehicle in accordance with this disclosure. Referring to FIG. 6a, an aerial vehicle's flight-control system may begin a trajectory planning algorithm at step 602. The flight control system may have a separate trajectory planning system that executes the trajectory planning method 600. After beginning execution, at step 604, the trajectory planner executes the iterative Dubins path algorithm at step 604.

FIG. 6b illustrates an example method 604 that a trajectory planner for an aerial vehicle may use to execute an iterative Dubins path algorithm. At step 602, the trajectory planner begins the iterative Dubins path algorithm. At step 622, the trajectory planner receives inputs including the starting position of the aerial vehicle, the heading and velocity of the aerial vehicle at the starting position, the ending position of the aerial vehicle, and the commanded heading and velocity of the aerial vehicle at the ending position. Then, at step 624, the trajectory planner calculates the turning radius of the aerial vehicle at the largest of the starting and ending velocity. Then using that turning radius calculated at step 624, at step 626 the trajectory planner calculates the Dubins path according to the known Dubins path method. Next, at step 628, the trajectory planner calculates a velocity achievable at that Dubins path calculated in step 626 based on kinematics and kinematic limits of the aerial vehicle. Based on the achievable velocity calculated in step 628, at step 630, the trajectory planner calculates a new turn radius. At step 632, the trajectory planner calculates a new Dubins path based on the new turn radius calculated in step 630. Then at step 634, the trajectory planner compares the achievable velocity to the commanded ending velocity. If the achievable velocity equals the commanded velocity, then at step 638 the trajectory planner ends the iterative Dubins path algorithm. If the achievable velocity does not equal the commanded velocity, then the trajectory planner checks at step 636 whether the predetermined maximum number of iterations of the algorithm has been reached. If the predetermined maximum number of algorithms has not been reached, then the method repeats steps 630-636. In some examples, the trajectory planner may not check the maximum number of iterations at step 636, and may instead repeat the algorithm until either the achievable velocity equals the commanded velocity, or in some examples until the achievable velocity is within some threshold value of the commanded velocity.

In some examples, rather than executing the iterative Dubins path algorithm at step 604, the trajectory planner may simply calculate the first iteration of the Dubins path. In other examples, at step 604, rather than computing a Dubins path in order to find trajectory segments, the trajectory planner may compute possible arc lengths and straight lines via other known geometric and kinematic methods.

Referring back to FIG. 6a, after executing the Dubins path algorithm at step 604, the trajectory planner executing the trajectory planning method 600 integrates the results of the iterative Dubins path algorithm into a brute force algorithm at step 606. While illustrated as a separate step, the iterative Dubins path algorithm may be implemented as a subroutine of the brute force and RRT algorithms. The Dubins path iterations create short trajectories that the brute force method can use as small trajectory segments. At step 606, the trajectory planner executes a brute force algorithm using the results of the iterative Dubins path algorithm to break the waypoint path into short segments, and link those segments together by the short Dubins path trajectories calculated in step 604. As explained above, a brute force method looks at possibilities from a starting point to a short segment ahead, and finds a trajectory segment with the least cost that moves towards the objective, repeating that process until the segment arrives at the objective. At step 608, the trajectory planner executes such a brute force method without attempting to avoid obstacles while using the results from the iterative Dubins path algorithm executed at step 604 as the possible trajectory segments. After executing the brute force method, at step 610, the trajectory planner inputs seed waypoints from segments calculated by the brute force method into an RRT algorithm. At step 612, the trajectory planner executes a modified RRT algorithm using the seed waypoints fed into the modified RRT algorithm at step 610.

FIG. 6c illustrates a modified RRT algorithm 612 using seed waypoints calculated by a brute force algorithm using trajectory segments calculated by an iterative Dubins path algorithm. At step 640, the trajectory planner begins the execution of the modified RRT algorithm. Then at step 642, the trajectory planner links (or attempts to link) the initial state to seed waypoints calculated by the brute force method. The RRT algorithm does not allow waypoints to link through obstacles. Next, at step 644, the trajectory planner checks if the linked waypoints go to the objective. If the linked waypoints go to the objective, then the trajectory planner ends the RRT algorithm at step 654. If the linked waypoints do not go to the objective, then the trajectory planner links (or attempts to link) the seed waypoints to the objective at step 646. Next, at step 648, the trajectory planner picks a random point in the environment, and adds it to the tree according to the RRT algorithm. Then at step 650, the trajectory planner links (or attempts to link) the random point to the seed waypoints, avoiding obstacles.

Then at step 652, the trajectory planner may check if a maximum number of iterations has been reached. If a maximum number of iterations has been reached, the trajectory planner ends the execution of the algorithm at step 654. If the maximum number of iterations has not been reached, then the method 612 returns to step 644 to check if the waypoints now go to the objective. The method may repeat this process until either a maximum number of iterations is reached, or until the waypoints go to the objective. In some examples, the modified RRT method 612 may not include checking the number of iterations, and may instead repeat steps 644-650 until a path to the objective is determined. In some example, other algorithms may be used in place of the RRT algorithm. For example, the known algorithms RRT* may be used in place of RRT, RRT* being a variant of RRT that converges to an optimal solution. Other algorithms may be used as well, including for example, and without limitation: rapidly exploring random graph, RRT*-Smart, Real-Time RRT*, Theta-RRT, A*-RRT, A*-RRT*, Informed RRT*, and closed loop RRT.

In some examples, the trajectory planner may go directly from step 604 to 612 without executing steps 606, 608, or 610. In such a method, the trajectory planner calculates possible trajectory segments using the iterative Dubins path algorithm, or some other method at step 604. Then at step 612, the trajectory planner executes an RRT, or some other method as described above, using the possible trajectory segments calculated at step 604.

Returning to FIG. 6a, after finding a path to the objective by executing the modified RRT algorithm, the trajectory planner may smooth the path at step 614 to reduce the total length of the trajectory. The trajectory planner then ends the execution of the trajectory planning method 600.

The method steps of the example implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

The above-cited patents, patent publications, articles, journals, and the like are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. A system for navigating an aerial vehicle having a flight control system along a flight trajectory, the system comprising:
    a sensor payload; and
    a processor operatively coupled with the sensor payload and in communication with the flight control system, wherein the processor is configured to:
        calculate a plurality of path trajectory segments based at least in part on sensor data from the sensor payload;
        calculate a first trajectory between a start point and an end point by linking the start point and end point via a series of the path trajectory segments;
        identify a plurality of seed waypoints via the first trajectory;
        calculate a second trajectory between the start point and the end point that avoids at least one obstacle, detected by the sensor payload, by executing a random searching algorithm that uses the plurality of seed waypoints;
        generate navigational commands to instruct the aerial vehicle to navigate from the start point to the end point along the second trajectory; and
        communicate the navigational commands to the flight control system.

2. The system of claim 1, wherein the processor is configured to calculate the plurality of path trajectory segments iteratively.

3. The system of claim 1, wherein the processor is configured to calculate the plurality of path trajectory segments using a method comprising the steps of:
    (a) receiving as inputs a starting position, a starting velocity, an ending position, and an ending velocity of the aerial vehicle;
    (b) calculating a turning radius from a larger of the starting velocity and the ending velocity;
    (c) calculating a first path trajectory segment based at least in part on the turning radius;
    (d) calculating an achievable velocity based at least in part on the first path trajectory segment and kinematic limits of the aerial vehicle; and
    (e) repeating steps (b) through (d) until the achievable velocity is substantially equal to the ending velocity, wherein in subsequent iterations of steps (b) through (d) the turning radius is calculated with the achievable velocity.

4. The system of claim 3, wherein executing the random searching algorithm includes executing a rapidly exploring random tree algorithm.

5. The system of claim 4, wherein executing the rapidly exploring random tree algorithm comprises the steps of:
    (a) linking the start point and at least one of the plurality of seed waypoints while avoiding obstacles to define linked waypoints;
    (b) checking if the linked waypoints connect the start point to the end point;
    (c) linking the end point and at least one of the plurality of seed waypoints while avoiding obstacles;
    (d) adding a random waypoint;
    (e) linking at least one of the plurality of seed waypoints to the random waypoint while avoiding obstacles;
    checking if the linked waypoints connect the start point to the end point; and
    (g) repeating steps (d) through (f) until the linked waypoints connect the start point to the end point.

6. The system of claim 5, wherein the processor is configured to smooth the second trajectory to shorten a length of the second trajectory.

7. The system of claim 1, wherein the sensor payload is coupled to an obstacle detecting system, wherein the processor is configured to calculate the second trajectory to avoid obstacles detected by the obstacle detection system.

8. The system of claim 7, wherein the sensor payload comprises at least one of: LIDAR, Radar, an echolocation system, or an optical sensor.

9. A method of navigating an aerial vehicle having a flight control system along a flight trajectory, the method comprising:
- calculating, via a processor, a plurality of trajectory segment possibilities based at least in part on sensor data from a sensor payload coupled to the aerial vehicle that reflects at least a first velocity of the aerial vehicle, wherein the processor is operatively coupled with the sensor payload and in communication with the flight control system;
- calculating, via the processor, a first trajectory between a start point and an end point by linking the start point and end point via a series of the trajectory segment possibilities;
- determining, via the processor, a plurality of seed waypoints via the first trajectory;
- calculating, via the processor, a second trajectory between the start point and the end point that avoids at least one obstacle by executing a random searching algorithm that uses the plurality of seed waypoints;
- generating, via the processor, navigational commands to instruct the aerial vehicle to navigate from the start point to the end point along the second trajectory; and
- communicating the navigational commands to the flight control system.

10. The method of claim 9, wherein the step of calculating a plurality of trajectory segment possibilities comprises:
    (a) receiving as inputs a starting position, a starting velocity, an ending position, and an ending velocity of the aerial vehicle;
    (b) calculating a turning radius from a larger of the starting velocity and the ending velocity;
    (c) calculating a first path trajectory segment possibility based at least in part on the turning radius;
    (d) calculating an achievable velocity based at least in part on the first path trajectory segment possibility and kinematic limits of the aerial vehicle; and
    (e) repeating steps (b) through (d) until the achievable velocity is substantially equal to the ending velocity, wherein in subsequent iterations of steps (b) through (d) the turning radius is calculated with the achievable velocity.

11. The method of claim 10, wherein the executing the random searching algorithm comprises the steps of:
    (a) linking the start point and at least one of the plurality of seed waypoints while avoiding obstacles to define linked waypoints;
    (b) checking if the linked waypoints connect the start point to the end point;
    (c) linking the end point and at least one of the plurality of seed waypoints while avoiding obstacles;
    (d) adding a random waypoint;
    (e) linking at least one of the plurality of seed waypoints to the random waypoint while avoiding obstacles;
    checking if the linked waypoints connect the start point to the end point; and
    (g) repeating steps (d) through (f) until the linked waypoints connect the start point to the end point.

12. The method of claim 10, wherein executing the random searching algorithm comprises the steps of:
    (a) linking the start point and at least one of the plurality of seed waypoints while avoiding obstacles;
    (b) checking if the linked waypoints connect the start point to the end point;
    (c) linking the end point and at least one of the plurality of seed waypoints while avoiding obstacles;
    (d) adding a random waypoint;
    (e) linking at least one of the plurality of seed waypoints to the random waypoint while avoiding obstacles;
    (f) checking if the linked waypoints connect the start point to the end point; and
    (g) repeating steps (d) through (f) until one of: the linked waypoints connect the start point to the end point, or a predetermined maximum number of iterations is reached.

13. The method of claim 9, wherein the step of calculating a plurality of trajectory segment possibilities comprises:
    (a) receiving as inputs a starting position, a starting velocity, an ending position, and an ending velocity of the aerial vehicle;
    (b) calculating a turning radius from a larger of the starting velocity and the ending velocity;
    (c) calculating a first path trajectory segment possibility based at least in part on the turning radius;
    (d) calculating an achievable velocity based at least in part on the first path trajectory segment possibility and kinematic limits of the aerial vehicle; and
    (e) repeating steps (b) through (d) until one of: the achievable velocity is substantially equal to the ending velocity, or a predetermined maximum number of iterations is reached,
        wherein in subsequent iterations of steps (b) through (d) the turning radius is calculated with the achievable velocity.

14. The method of claim 9, further comprising executing a smoothing algorithm to shorten the obstacle avoiding trajectory.

15. The method of claim 9, wherein calculating the second trajectory is based at least in part on a change in velocity of the aerial vehicle between the seed waypoints.

16. The method of claim 9, further comprising detecting at least one obstacle, wherein the second trajectory avoids the at least one detected obstacle.

17. A method of navigating an aerial vehicle having a flight control system along a flight trajectory, the method comprising:
- calculating, via a processor that is in communication with the flight control system, a plurality of trajectory segment possibilities by executing the steps of:
    (a) receiving as inputs a starting position, a starting velocity, an ending position, and an ending velocity of the aerial vehicle;
    (b) calculating a turning radius from a larger of the starting velocity and the ending velocity;
    (c) calculating a first path trajectory segment possibility based at least in part on the turning radius;
    (d) calculating a velocity achievable based at least in part on the first path trajectory segment possibility and kinematic limits of the aerial vehicle;
    (e) repeating steps (b) through (d) until an achievable velocity is substantially equal to the ending velocity, wherein in subsequent iterations of steps (b) through (d) the turning radius is calculated with the achievable velocity; and
    calculating, via the processor, an obstacle avoiding trajectory between a starting position and an ending position by executing a random searching algorithm that uses the plurality of trajectory segment possibilities;
    generating, via the processor, navigational commands to instruct the aerial vehicle to navigate from the starting position to the ending position along the obstacle avoiding trajectory; and communicating the navigational commands to the flight control system.

18. The method of claim 17, wherein executing the random searching algorithm includes executing a rapidly exploring random tree algorithm.

19. The method of claim 18, wherein executing the rapidly exploring random tree algorithm comprises the steps of:
   (a) linking the start point and at least one of a plurality of seed waypoints while avoiding obstacles;
   (b) checking if the linked waypoints connect the start point to the end point;
   (c) linking the end point and at least one of the plurality of seed waypoints while avoiding obstacles;
   (d) adding a random waypoint;
   (e) linking at least one of the plurality of seed waypoints to the random waypoint while avoiding obstacles;
   (f) checking if the linked waypoints connect the start point to the end point; and
   (g) repeating steps (d) through (f) until the linked waypoints connect the start point to the end point.

20. The method of claim 19, wherein the processor is configured to smooth the obstacle avoiding trajectory to shorten a length of the obstacle avoiding trajectory.

* * * * *